US011390273B2

(12) United States Patent
Ishinoda et al.

(10) Patent No.: US 11,390,273 B2
(45) Date of Patent: Jul. 19, 2022

(54) PARKING ASSISTANCE APPARATUS

(71) Applicant: Clarion Co., Ltd., Saitama (JP)

(72) Inventors: Makoto Ishinoda, Saitama (JP);
Shinya Tagawa, Saitama (JP);
Noriyasu Hasejima, Tokyo (JP)

(73) Assignee: CLARION CO., LTD., Saitama (JP)

( * ) Notice: Subject to any disclaimer, the term of this patent is extended or adjusted under 35 U.S.C. 154(b) by 35 days.

(21) Appl. No.: 17/043,527

(22) PCT Filed: Mar. 12, 2019

(86) PCT No.: PCT/JP2019/009918
§ 371 (c)(1),
(2) Date: Sep. 29, 2020

(87) PCT Pub. No.: WO2019/188241
PCT Pub. Date: Oct. 3, 2019

(65) Prior Publication Data
US 2021/0107464 A1    Apr. 15, 2021

(30) Foreign Application Priority Data
Mar. 30, 2018  (JP) .............................. JP2018-070438

(51) Int. Cl.
*B60W 30/06*    (2006.01)
*B60W 40/10*    (2012.01)
*B60W 40/12*    (2012.01)

(52) U.S. Cl.
CPC ............ *B60W 30/06* (2013.01); *B60W 40/10* (2013.01); *B60W 40/12* (2013.01); *B60W 2520/06* (2013.01); *B60W 2554/80* (2020.02)

(58) Field of Classification Search
CPC ...... B60W 30/06; B60W 40/10; B60W 40/12; B60W 2520/06; B60W 2554/80; G08G 1/168; B62D 15/028; B62D 15/0285
See application file for complete search history.

(56) References Cited

U.S. PATENT DOCUMENTS

| 2016/0075329 | A1* | 3/2016 | Tomozawa | B60W 10/20 |
| | | | | 701/41 |
| 2017/0015312 | A1* | 1/2017 | Latotzki | B62D 15/0285 |
| 2019/0322318 | A1* | 10/2019 | Hasejima | B60W 50/12 |

FOREIGN PATENT DOCUMENTS

| DE | 10 2015 115209 A1 | 3/2016 |
| JP | 2010-208392 A | 9/2010 |
| WO | WO 2018/003411 A1 | 1/2018 |

OTHER PUBLICATIONS

International Search Report corresponding to PCT/JP2019/009918, dated Jun. 11, 2019, with English translation, 6 pages.

(Continued)

*Primary Examiner* — Jeff A Burke
*Assistant Examiner* — Sihar A Karwan
(74) *Attorney, Agent, or Firm* — Lewis Roca Rothgerber Christie LLP

(57) ABSTRACT

A parking assistance apparatus capable of making a parking route shorter when providing parking assistance for parallel parking is obtained. The parking assistance apparatus according to the present invention is a parking assistance apparatus for assisting the parallel parking of a driver's own vehicle 21 and has a configuration that: calculates an escapable position where the driver's own vehicle 21 can be made to escape from a parking area Sp; calculates a parking-space leaving route E where the driver's own vehicle 21 can be moved from the escapable position to an initial position P0 in a passage area Sr; and sets a parking route based on the parking-space leaving route E. The parking-space leaving route E is calculated by using a first turning circle C1 when turning from the escapable position P2 to a passage side, a second turning circle C2 when turning in a direction of a target parking position P1 at the initial position P0 of the driver's own vehicle 21, and a third turning circle which is a locus of a turning center when the driver's own vehicle 21

(Continued)

has moved along the first turning circle C1 and turns in a direction different from the first turning circle C1.

5 Claims, 33 Drawing Sheets

(56) References Cited

OTHER PUBLICATIONS

Extended European Search Report dated Nov. 5, 2021 for corresponding European Application No. 19775288.4 (5 pages).

* cited by examiner

FIG. 7
(1)            (2)
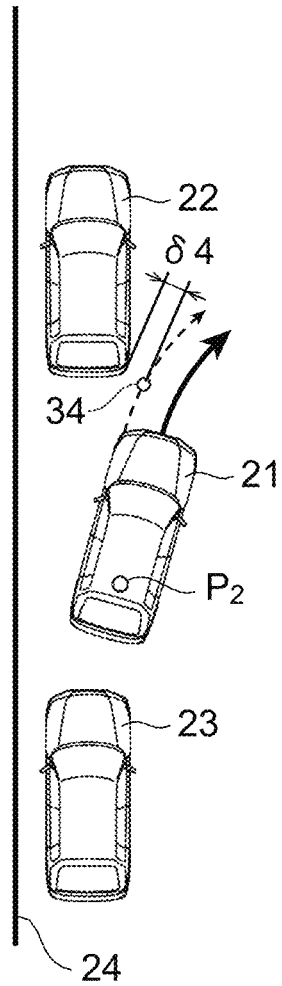
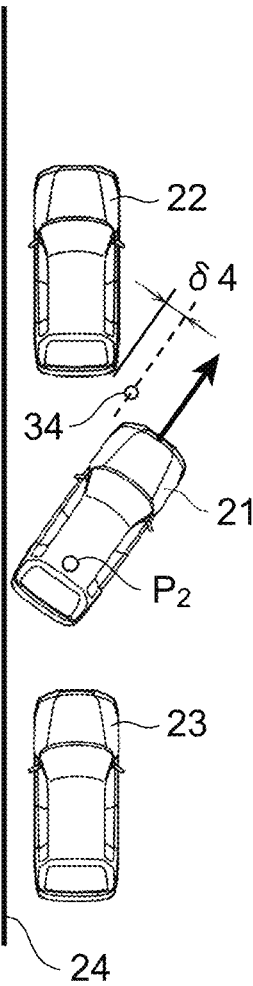

PARKING ASSISTANCE APPARATUS

CROSS-REFERENCE TO RELATED APPLICATION(S)

This application is a U.S. National Phase Patent Application and claims priority to and the benefit of International Application Number PCT/JP2019/009918, filed on Mar. 12, 2019, which claims priority of Japanese Patent Application Number 2018-070438, filed on Mar. 30, 2018, the entire contents of all of which are incorporated herein by reference.

TECHNICAL FIELD

The present invention relates to a parking assistance apparatus for assisting parallel parking of a driver's own vehicle.

BACKGROUND ART

PTL 1 describes a technology of a parking assistance apparatus for calculating a guiding route including turning of a steering wheel to one direction and to the other direction to move a vehicle forward and backward to park the vehicle and assisting the vehicle to reach a target position along that guiding route.

CITATION LIST

Patent Literature

PTL 1: Japanese Patent Application Laid-Open (Kokai) Publication No. 2010-208392

SUMMARY OF THE INVENTION

Problems to be Solved by the Invention

The technology of PTL 1 generates a parking route by linking a circular arc which connects from an initial position where the parking assistance is started, to a turning back position and a circular arc which connects from the turning back position to a target parking position. When the technology of PTL 1 is applied to parallel parking, there is a fear that the turning back position may become farther away from the target parking position towards a passage direction and the route may become longer, thereby resulting in a fear of causing anxiety to a driver and a problem of difficulty in conveying the driver's intention of where to park his/her own vehicle to other surrounding vehicles. Furthermore, a case where each circular arc becomes large and the route cannot be set due to the relation to obstacles happens very often and the number of scenes where the parking assistance can be actually used may decrease, so that there is a fear that the parking assistance may not be user-friendly and, as a result, may no longer be used.

The present invention was devised in light of the above-described circumstances and it is an object of the present invention to provide a parking assistance apparatus capable of making a parking route much shorter when providing the parking assistance for the parallel parking.

Means to Solve the Problems

The parking assistance apparatus of the present invention to solve the above-described problems is a parking assistance apparatus for assisting parallel parking of a driver's own vehicle, wherein the parking assistance apparatus includes: an escapable position calculation unit that calculates an escapable position where the driver's own vehicle can escape from a parking area to a passage area by moving the driver's own vehicle on the basis of a target parking position;
a parking-space leaving route calculation unit that calculates a parking-space leaving route where the driver's own vehicle can be moved from the escapable position to an initial position in the passage area; and
a parking route setting unit that sets a parking route for moving the driver's own vehicle from the initial position to the target parking position according to the parking-space leaving route,
wherein the parking-space leaving route calculation unit calculates the parking-space leaving route by using a first turning circle when turning from the escapable position to a passage side, a second turning circle when turning in a direction of the target parking position at the initial position of the driver's own vehicle, and a third turning circle which is a locus of a turning center when the vehicle has moved along the first turning circle and turns in a direction different from the first turning circle.

Advantageous Effects of the Invention

The parking route for providing the parking assistance for the parallel parking can be further shortened according to the present invention. Further features related to the present invention will be made clear by the description of this specification and the attached drawings. Furthermore, objects, configurations, and advantageous effects other than those described above will be made clear by the following explanation of embodiments.

BRIEF DESCRIPTION OF DRAWINGS

FIG. 7 is a diagram for explaining the escapable position;

DESCRIPTION OF EMBODIMENTS

Next, embodiments of the present invention will be explained by using the drawings. Incidentally, in the following description, an explanation will be provided about a case of parallel parking a driver's own vehicle in a parking area on the left side of a passage from an initial position in a passage area; however, the present invention can be also similarly applied to a case of parallel parking the driver's own vehicle in a parking area on the right side of the passage from the initial position in the passage area.

Figure 1:
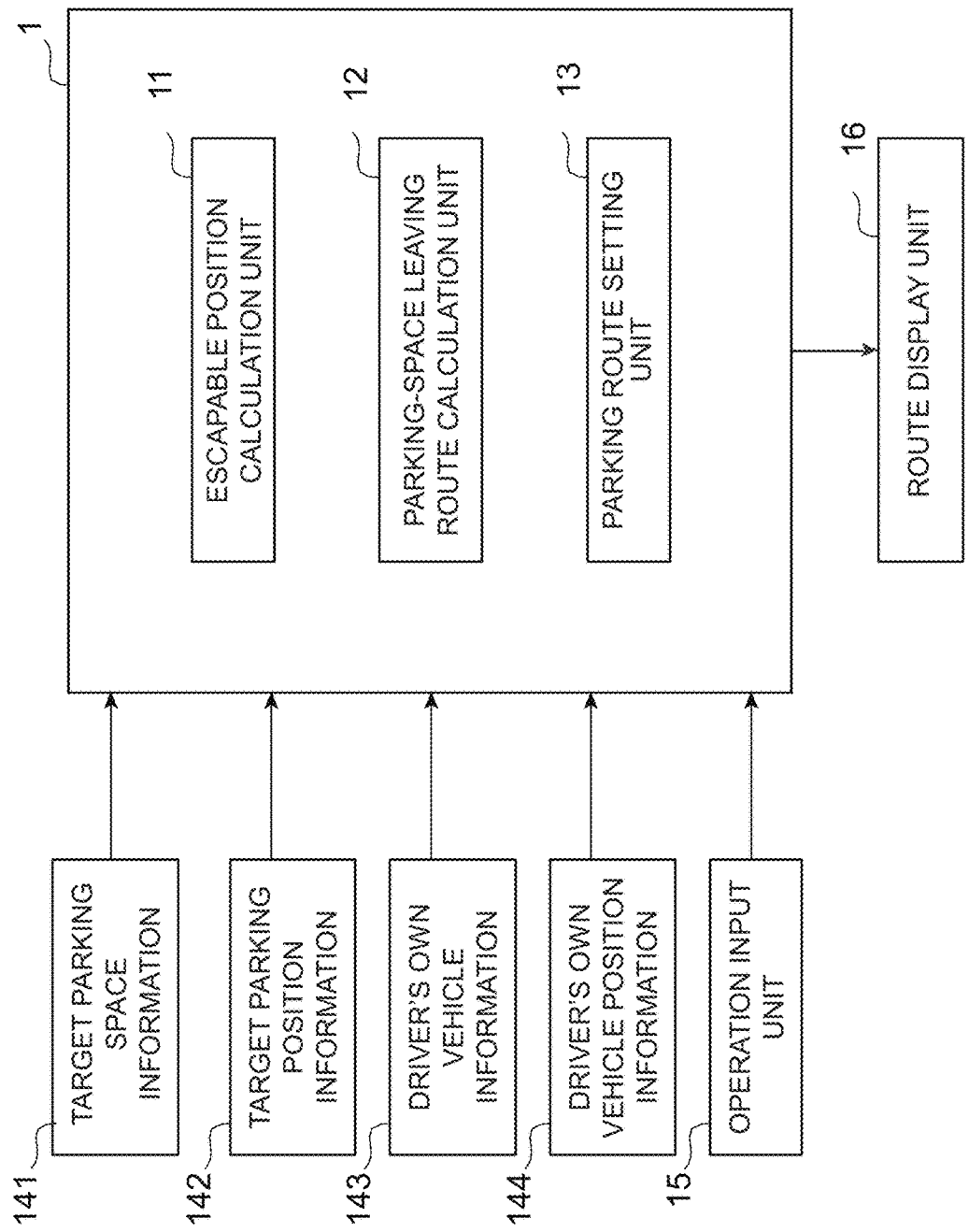
FIG. 1 is a functional block diagram of a parking assistance apparatus according to an embodiment of the present invention.
Figure 2:
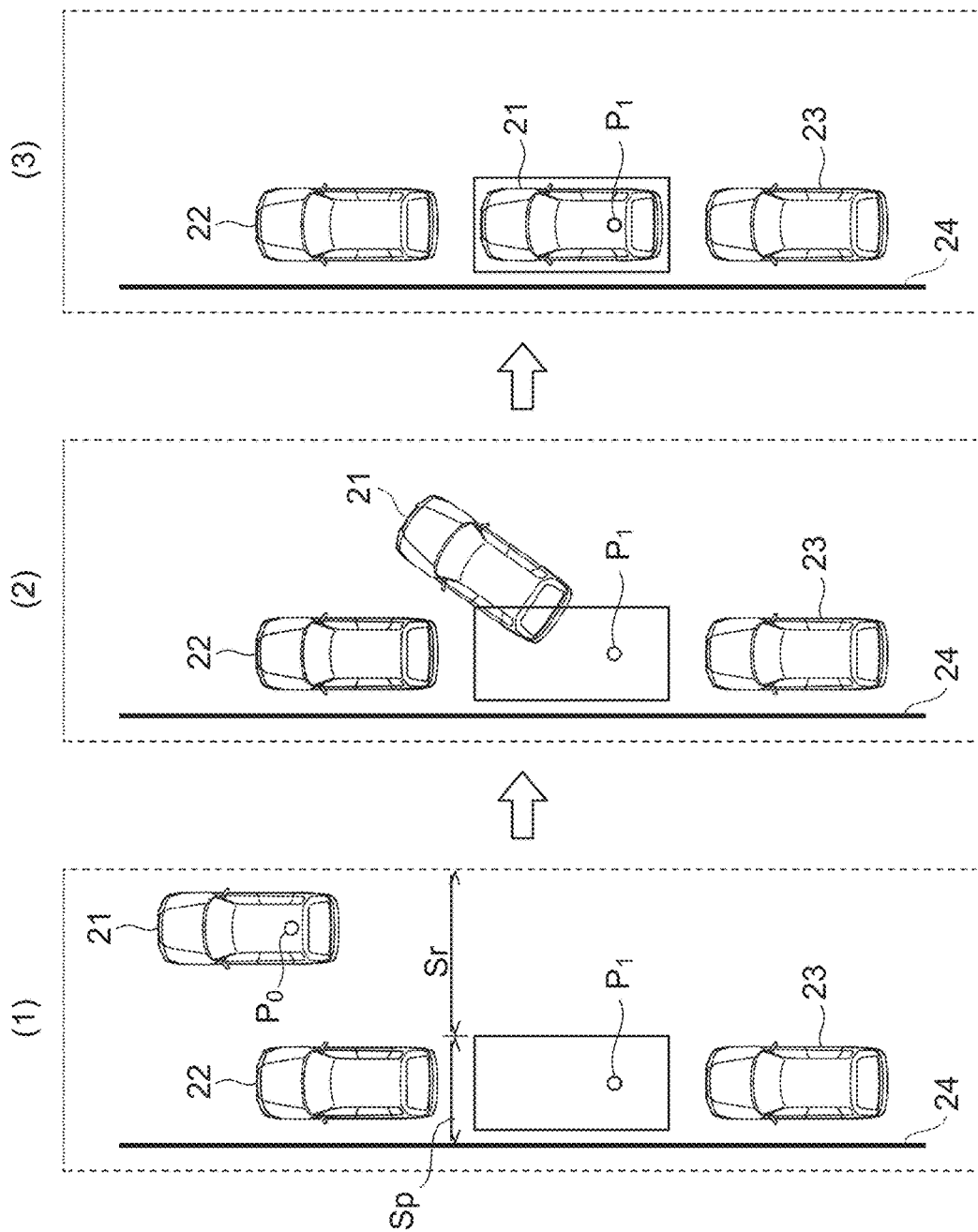
FIG. 2 is a diagram for explaining movements of a driver's own vehicle upon parallel parking.

FIG. 1 is a functional block diagram of a parking assistance apparatus according to an embodiment of the present invention; and FIG. 2 is a diagram for explaining movements of the driver's own vehicle upon parallel parking.

In a case of an example illustrated in FIG. 2, a road has a passage area Sr on the right side in a traveling direction of the road (the right side in a road-width direction) and has a parking area Sp on the left side in the traveling direction of the road (the left side in the road-width direction). Regarding the parking area Sp, a forward obstacle 22 and a backward obstacle 23 are placed in front of and behind the parking area Sp and a lateral-side obstacle 24 is placed on the left side of the parking area Sp, so that three sides of the parking area Sp are blocked and only the right side in the road-width direction, that is, only the passage area Sr side is open. The forward obstacle 22 and the backward obstacle 23 are, for example, other vehicles and the lateral-side obstacle 24 is, for example, a curbstone or a wall. The parking area Sp is an area for parallel parking and its parking direction is set so that the direction of the driver's own vehicle 21 becomes parallel to the traveling direction in the passage area Sr when the driver's own vehicle 21 is parked at a target parking position P1 in the parking area Sp.

The parallel parking is to, for example, cause the driver's own vehicle 21, which is in a stopped state at an initial position P0 in the passage area Sr ahead of the target parking position P1 (FIG. 2(1)), to move backward and turn to the left to make the back part of the driver's own vehicle 21 enter the parking area Sp (FIG. 2(2)) as illustrated in FIG. 2. Then, the driver's own vehicle 21 is located so that its facing direction at the target parking position P1 in the parking area Sp is aligned with the parking direction (FIG. 2(3)). If the facing direction of the driver's own vehicle 21 at the target parking position P1 is not aligned with the parking direction, actions to turn the steering wheel to one direction and then to the other direction are performed to move the driver's own vehicle 21 forward and backward between the forward obstacle 22 and the backward obstacle 23 until the facing direction of the driver's own vehicle 21 becomes aligned with the parking direction. Incidentally, in this embodiment, whether or not the driver's own vehicle 21 is located at each position such as the initial position P0, the target parking position P1, or an escapable position P2 described later (see FIG. 7) is judged based on a reference point which is an intermediate position between the right and left rear wheels of the driver's own vehicle 21. Furthermore, turning is performed along, for example, a steady-state circle or a clothoid curve.

A parking assistance apparatus 1 according to the present invention is designed to assist the parallel parking of the driver's own vehicle 21 to reach the target parking position P1 from the initial position P0 and is suited for assisting actions of the parallel parking, which starts with a backward movement. The parking assistance apparatus 1 can calculate a parking route for guiding the driver's own vehicle 21 and cause the driver's own vehicle 21 to perform the parallel parking by guiding and moving the driver's own vehicle 21 along the calculated parking route. A system for causing the driver's own vehicle 21 to automatically or semi-automatically perform the parallel parking at the target parking position P1 may be implemented by outputting information of the parking route from the parking assistance apparatus 1. In a case of the semi-automatic parking, for example, steering wheel operations may be conducted by automatic control and accelerator operations and brake operations are conducted by the driver.

The parking assistance apparatus 1 is mounted in the driver's own vehicle 21 and is implemented by cooperation between hardware such as a microcomputer and software programs. The parking assistance apparatus 1 includes, as illustrated in FIG. 1, an escapable position calculation unit 11, a parking-space leaving route calculation unit 12, and a parking route setting unit 13.

The escapable position calculation unit 11 calculates an escapable position where the driver's own vehicle 21 can escape from the parking area Sp to the passage area Sr by a steering-wheel-turning-and-advance movement or a straight advance movement of the driver's own vehicle 21 on the basis of the target parking position P1. The parking-space leaving route calculation unit 12 calculates a parking-space leaving route where the driver's own vehicle 21 can be moved from the escapable position P2 to the initial position P0 in the passage area Sr. The parking route setting unit 13 sets a parking route for moving the driver's own vehicle 21 from the initial position P0 to the target parking position P1 on the basis of the parking-space leaving route.

Referring to FIG. 1, target parking space information 141, target parking position information 142, the driver's own vehicle information 143, and the driver's own vehicle position information 144 are input to the parking assistance apparatus 1. The target parking space information 141 includes information which serves as constraint conditions for a parking space such as distances to surrounding walls and other vehicles. The target parking space information 141 can be acquired from, for example, a detection signal of an ultrasonic wave sensor mounted in the driver's own vehicle 21 and images from an in-vehicle camera and may be acquired via road-to-vehicle communications and inter-vehicle communications.

The target parking position information 142 includes information such as coordinate information of the target parking position P1 and a relative position with the driver's own vehicle 21 and the driver's own vehicle information 143 includes information which serves as behavior constraint conditions of the driver's own vehicle such as a turning radius of the driver's own vehicle 21. Then, dead reckoning calculated by a vehicle model from a steering angle and speed of the driver's own vehicle 21 and a rotation amount of wheels may be utilized and positional information acquired by a sensor such as a GPS and positional information of the driver's own vehicle which is obtained via the road-to-vehicle and inter-vehicle communications may be utilized as the driver's own vehicle position information 144.

The operation input unit 15 inputs, for example, information of the target parking position P1, which is selected by a user, to the parking assistance apparatus 1. The route display unit 16: is an in-vehicle monitor which the driver can watch inside the vehicle; and can display a position(s) to turn the steering wheel in a target parking route by overlaying it/them on a video from the camera. Furthermore, not only the steering-wheel-turning position(s), but also the entire parking route may be displayed.

The driver can check the steering-wheel-turning position (s) and the parking route by watching the steering-wheel-turning position(s) and the parking route which are displayed on the in-vehicle monitor.

<Escapable Position Calculation Unit>

The escapable position calculation unit 11 calculates the escapable position P2 based on the target parking position P1. Specifically speaking, the escapable position P2 is calculated based on the target parking space information 141 about, for example, obstacles in front of and behind the target parking position P1 where the parallel parking is to be performed, the target parking position information 142 such as coordinate position information of the target parking position P1, and the driver's own vehicle information 143 about vehicle specifications such as the size and minimum rotation radius of the driver's own vehicle.

Figure 8:
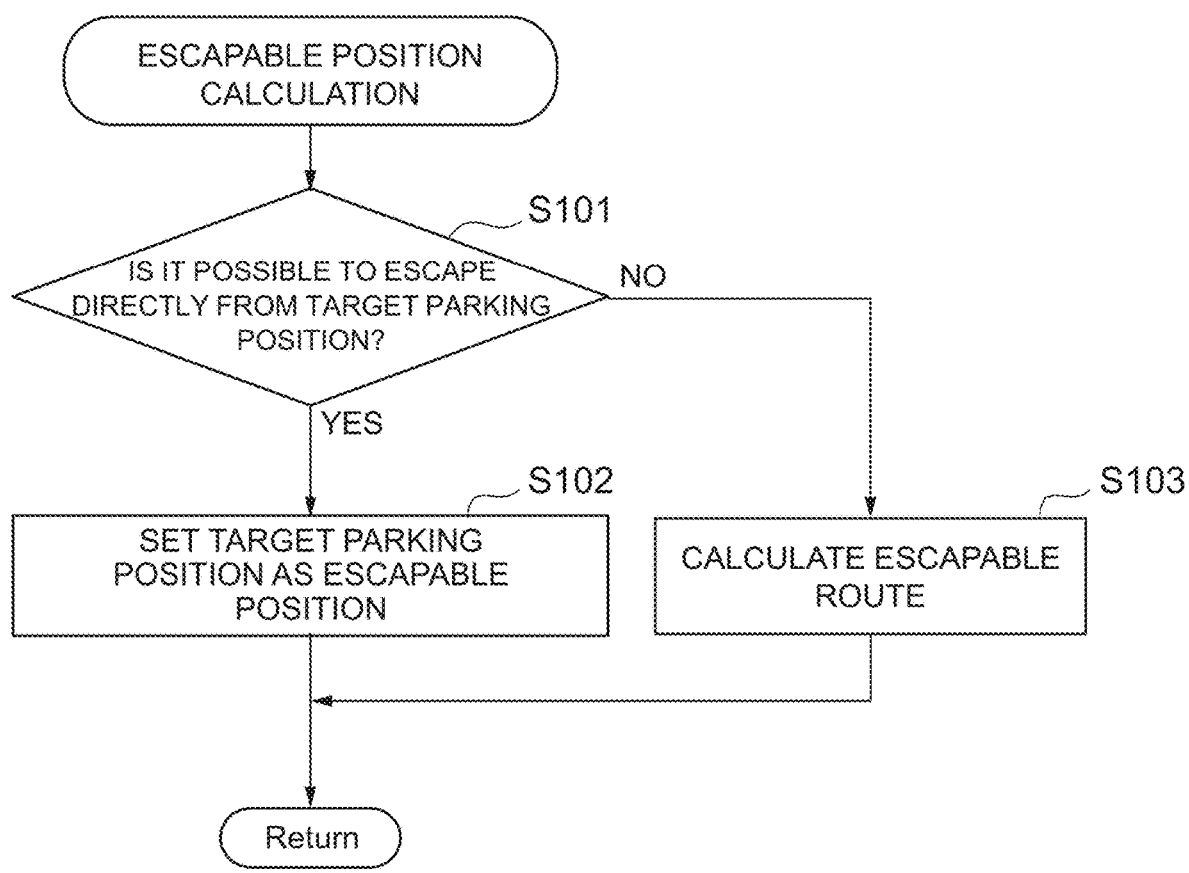
FIG. 8 is a flowchart explaining a method for calculating the escapable position.

FIG. 8 is a flowchart explaining a method for calculating the escapable position. The escapable position calculation unit 11 judges whether or not the driver's own vehicle 21 can directly escape from the parking area Sp to the passage area Sr by a steering-wheel-turning-and-advance movement or a straight advance movement from the target parking position P1, on the basis of the target parking space information 141, the target parking position information 142, and the driver's own vehicle information 143 (S101). Then, if it is determined that the driver's own vehicle 21 can be made to directly escape from the target parking position P1 in the parking area Sp to the passage area Sr without turning the steering wheel to one direction and then to the other direction to move forward and backward (YES in S101), the target parking position P1 is set as the escapable position P2 (S102). In other words, if the driver's own vehicle 21 can be made to escape from the parking area Sp to the passage area Sr simply by the steering-wheel-turning-and-advance movement of the driver's own vehicle 21 from the target parking position P1, the target parking position P1 is set as the escapable position P2.

On the other hand, if it is determined that the driver's own vehicle 21 cannot be made to directly escape from the target parking position P1 to the passage area Sr (NO in S101), an escapable route for moving the driver's own vehicle from the target parking position P1 to the escapable position P2 is calculated (S103). For example, in a case of the steering-wheel-turning-and-advance movement or the straight advance movement of the driver's own vehicle 21 from the target parking position P1, if the forward obstacle 22 becomes an impediment and the driver's own vehicle 21 cannot be made to directly escape from the parking area Sp to the passage area Sr, it is determined that it is impossible to escape.

If it is determined that it is impossible to escape, a route capable of locating the driver's own vehicle 21 at the escapable position P2 by moving the driver's own vehicle 21 forward or backward from the target parking position P1 at least once and then turning the steering wheel is calculated and the calculated route is set as an escapable route.

The escapable route is a virtual moving route which is an estimated route for the driver's own vehicle 21 in a state of being parked with a correct facing direction at the target parking position P1 to reach the escapable position P; and the escapable route includes at least one or more turns of the steering wheel to one direction and to the other direction to move the driver's own vehicle 21 forward and backward. The escapable route is calculated based on the parking space and the driver's own vehicle behavior constraint conditions. The escapable route is calculated completely regardless of, and without the constraint of, the initial position of the driver's own vehicle 21.

Figure 3:
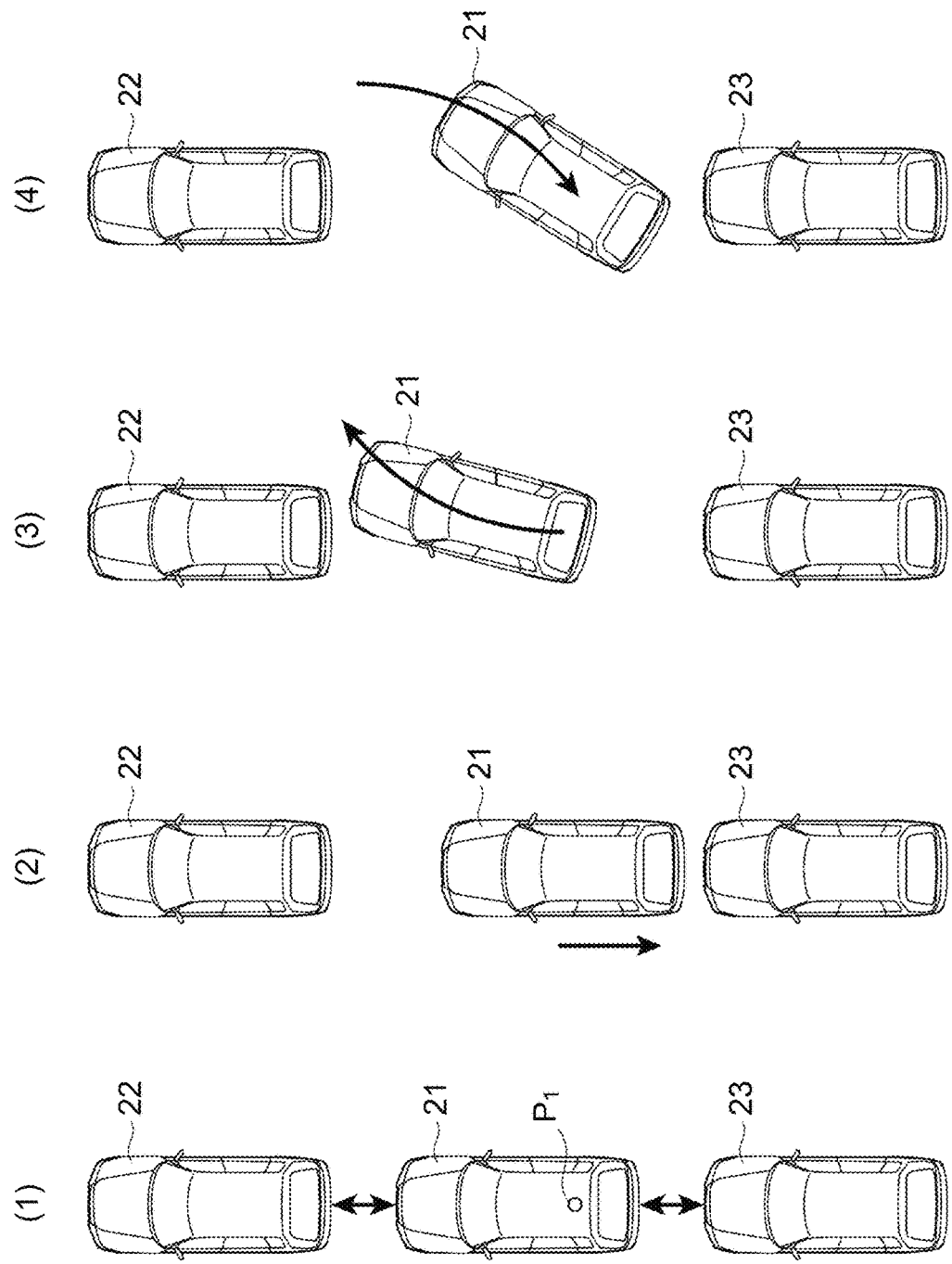
FIG. 3 is a diagram for explaining an example of movements of the driver's own vehicle until it reaches an escapable route.
Figure 4:
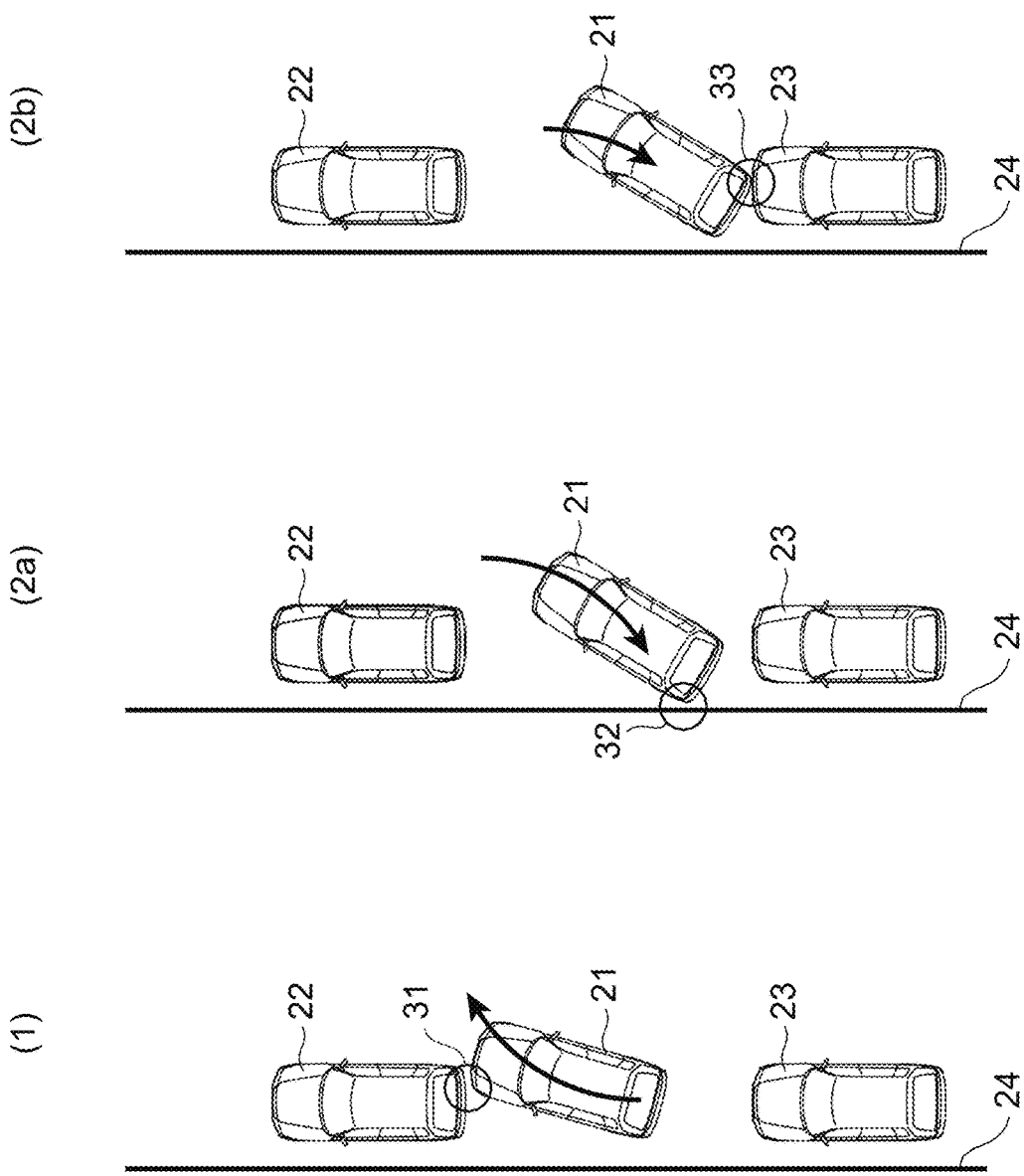
FIG. 4 is a diagram for explaining positions to switch between a forward movement and a backward movement in the escapable route.
Figure 5:
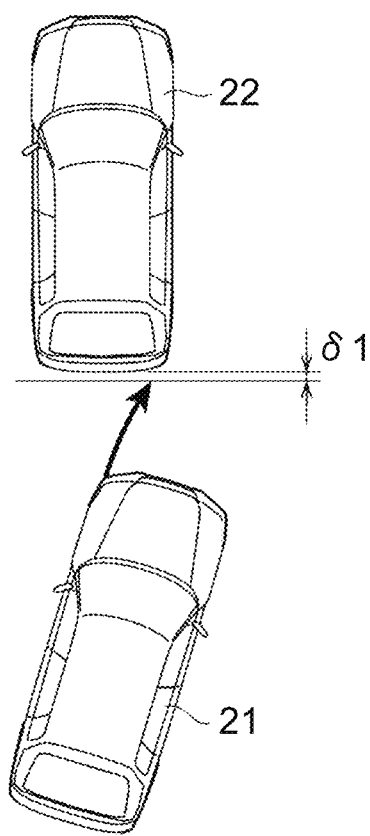
FIG. 5 is a diagram for explaining a movement amount upon the forward movement.
Figure 6:
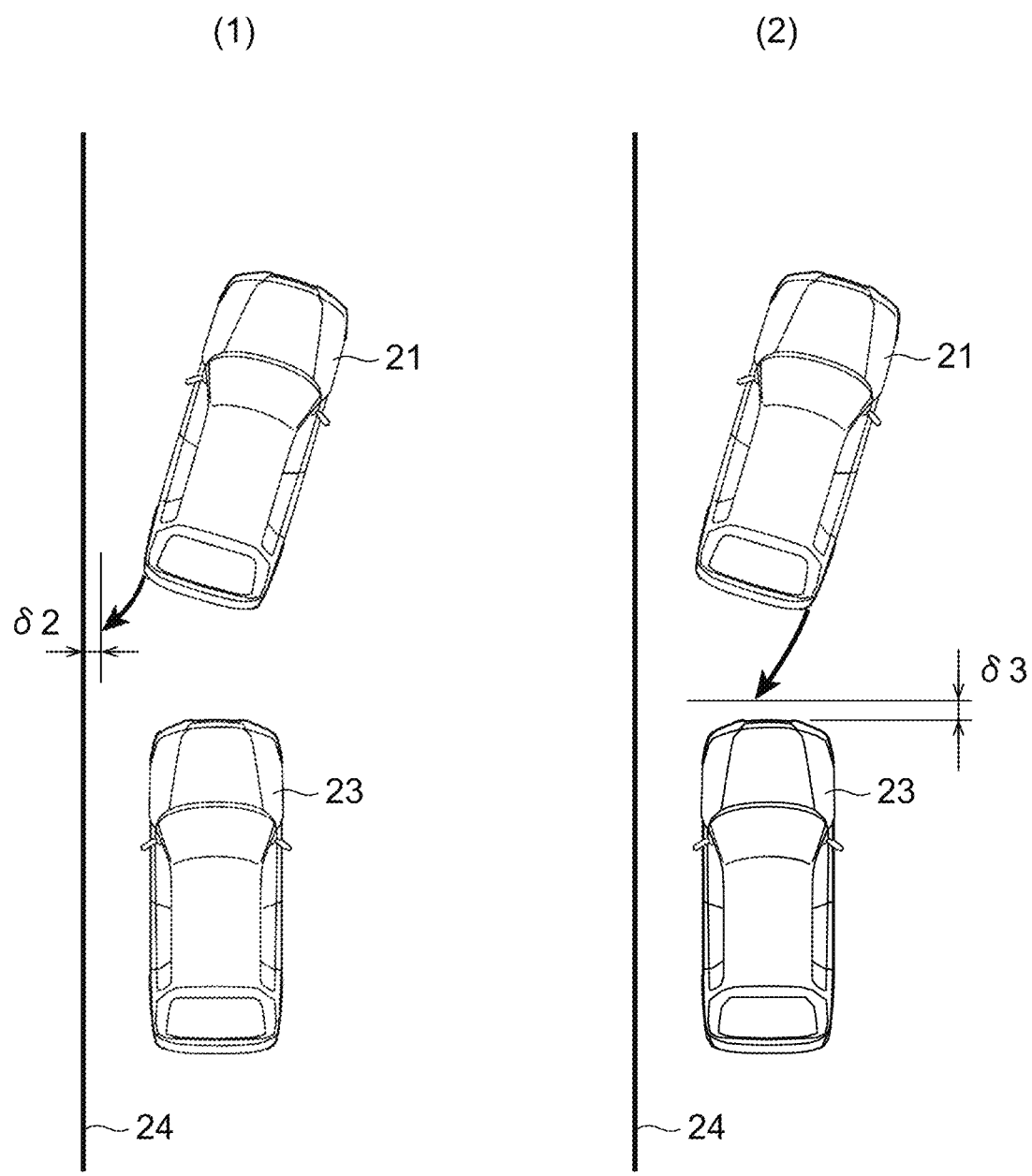
FIG. 6 is a diagram for explaining a movement amount upon the backward movement.

FIG. 3 is a diagram for explaining an example of movements of the driver's own vehicle until it reaches the escapable route; FIG. 4 is a diagram for explaining positions to switch between a forward movement and a backward movement in the escapable route; FIG. 5 is a diagram for explaining a movement amount upon the forward movement; FIG. 6 is a diagram for explaining a movement amount upon the backward movement; and FIG. 7 is a diagram for explaining the escapable position.

If the escapable position calculation unit 11 determines that the driver's own vehicle 21 cannot be made to escape from the parking area Sp to the passage area Sr by the steering-wheel-turning-and-advance movement or the straight advance movement from the state illustrated in FIG. 3(1), the escapable position calculation unit 11 calculates a route for moving the driver's own vehicle 21 straight backward from the target parking position P1 (FIG. 3(2)) and turning the steering wheel at a backward movable limit position and then turning to the right while moving forward (FIG. 3(3)).

Then, if the forward obstacle 22 becomes an impediment and it is impossible to make the driver's own vehicle 21 escape from the parking area Sp, the escapable position calculation unit 11 calculates a route for turning the steering wheel at a forward movable limit position, turning to the left while moving backward (FIG. 3(4)), and repeatedly turning the steering wheel to one direction and then to the other direction alternately as illustrated in FIG. 3(3) and FIG. 3(4) until the driver's own vehicle reaches the escapable position. Then, a locus of movements to reach the escapable position P2 as illustrated in FIG. 7(1) and FIG. 7(2) is further calculated as the escapable route.

The escapable position calculation unit 11 recognizes a position where the front part of the driver's own vehicle 21 comes close to a limit distance to the forward obstacle 22 as indicated with the reference numeral 31 in FIG. 4(1) as a forward movable limit position. Then, either a position where the back part of the driver's own vehicle 21 comes close to a limit distance to the lateral-side obstacle 24 as indicated with the reference numeral 32 in FIG. 4(2a), or a position where the back part of the driver's own vehicle 21 comes close to a limit distance to the backward obstacle 23 as indicated with the reference numeral 33 in FIG. 4(2b), whichever has a shorter movement distance from the limit distance, is adopted as a backward movable limit position.

The forward movable limit position is set at a position with a specified gap δ1 of, for example, approximately 1 cm to 50 cm away from a position where the front part of the driver's own vehicle 21 enters into contact with the forward obstacle 22 by a forward movement as illustrated in FIG. 5. Then, the backward movable limit position is set at a position with a specified gap δ2 or δ3 of, for example, approximately 5 cm to 10 cm away from a position where the back part of the driver's own vehicle 21 enters into contact with the lateral-side obstacle 24 or the backward obstacle 23 by a backward movement as illustrated in FIG. 6(1) and FIG. 6(2).

The escapable position P2 is: a position where the driver's own vehicle 21 has a gap δ4 from the forward obstacle 22 and can escape from the parking area Sp to the passage area Sr when the driver's own vehicle 21 turns to the right while moving forward (advance movement and turning the steering wheel) as illustrated in FIG. 7(1); and a position where the driver's own vehicle 21 has a gap δ4 from the forward obstacle 22 and can escape from the parking area Sp to the passage area Sr when the driver's own vehicle moves straight forward (straight advance movement) as illustrated in FIG. 7(2). This gap δ4 includes a margin in consideration of an error or the like so that the driver's own vehicle 21 would not enter into contact with the forward obstacle 22; and the gap δ4 should preferably be as small as possible and is set as, for example, approximately 1 cm to 50 cm.

<Parking-Space Leaving Route Calculation Unit>

Figure 9:
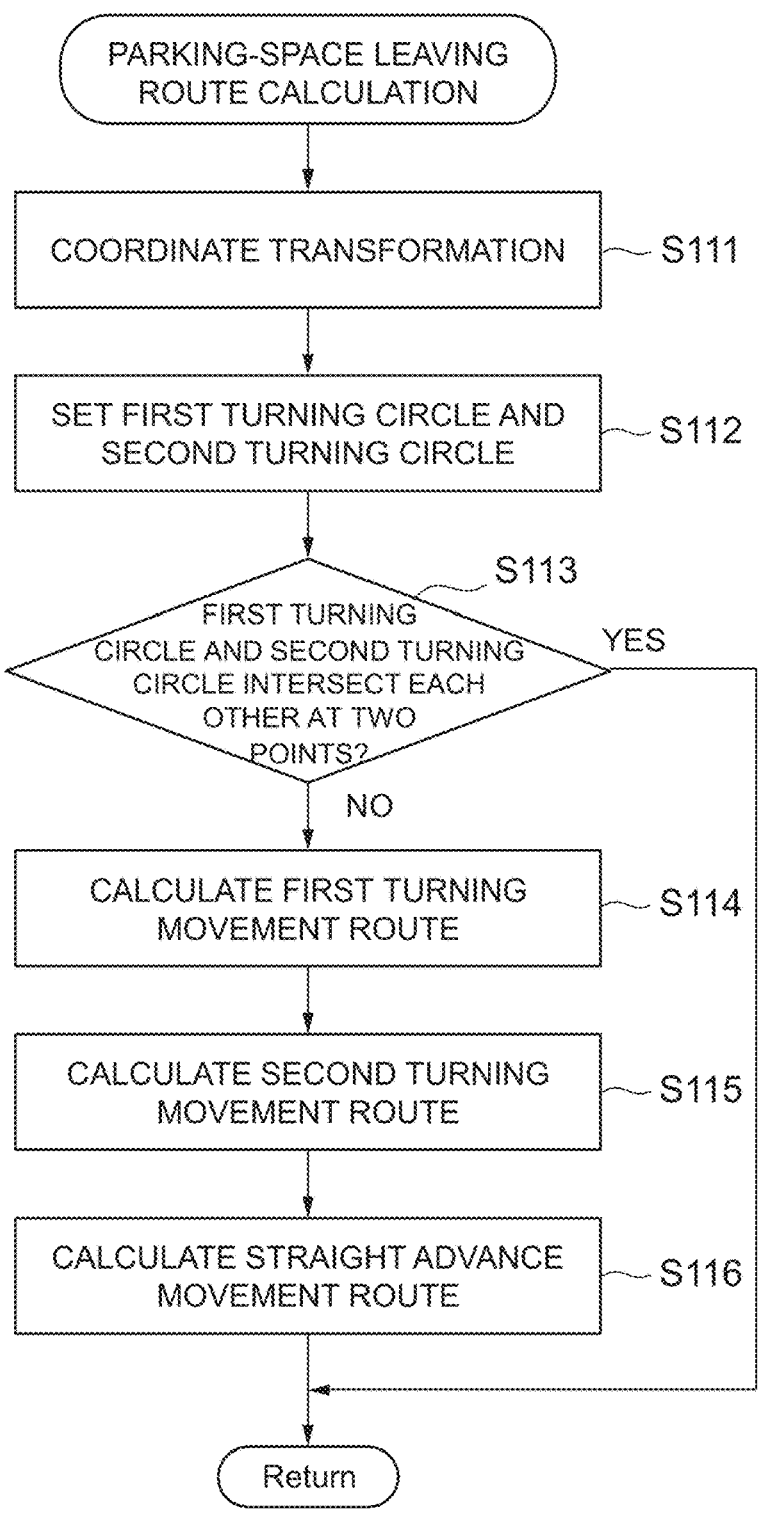
FIG. 9 is a flowchart explaining a method for calculating a parking-space leaving route.

FIG. 9 is a flowchart explaining a method for calculating a parking-space leaving route. Then, FIG. 11 to FIG. 33 are diagrams for explaining a method for calculating the parking-space leaving route. FIG. 11 to FIG. 21 are diagrams for explaining examples of the method for calculating the parking-space leaving route when the target parking position P1 is set as the escapable position P2. Then, FIG. 22 to FIG. 33 are diagrams for explaining examples of the method for calculating the parking-space leaving route when the escapable route is calculated and the escapable position P2 is set at a place different from the target parking position P1.

The parking-space leaving route calculation unit 12 calculates a parking-space leaving route E by using: a first turning circle C1 when turning from the escapable position towards the passage side; a second turning circle C2 when turning at the initial position P0 of the driver's own vehicle 21 to a direction of the target parking position P; and a third turning circle C3 which is a locus of a turning center when the driver's own vehicle 21 has moved along the first turning circle C1 and turns to a direction different from the first turning circle C1.

The parking-space leaving route calculation unit 12 performs coordinate transformation of first normal coordinates, whose origin is the escapable position P2, into second normal coordinates whose origin is the initial position P0 of the driver's own vehicle 21 (S111). The first normal coordinates are a coordinate system regarding which a front-back direction relative to the vehicle's facing direction at the escapable position P2 is a vertical axis Y and a vehicle width direction relative to the vehicle's facing direction is a horizontal axis X; and the second normal coordinates are a coordinate system regarding which the direction of the front-back direction of the driver's own vehicle 21 at the initial position is a vertical axis y and the direction of the vehicle width direction of the driver's own vehicle 21 is a horizontal axis x.

Figure 11:
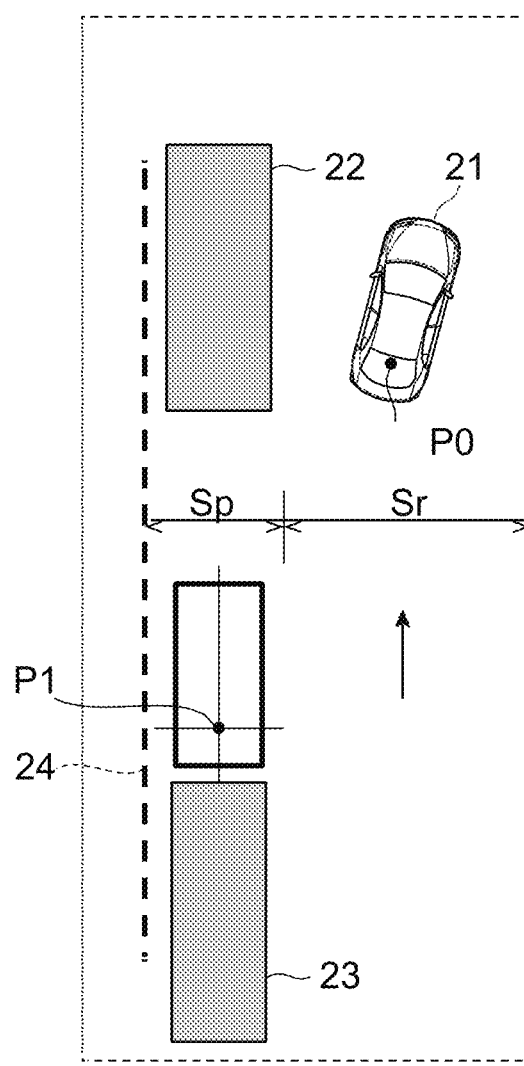
FIG. 11 is a diagram for explaining an example of the method for calculating the parking-space leaving route.
Figure 12:
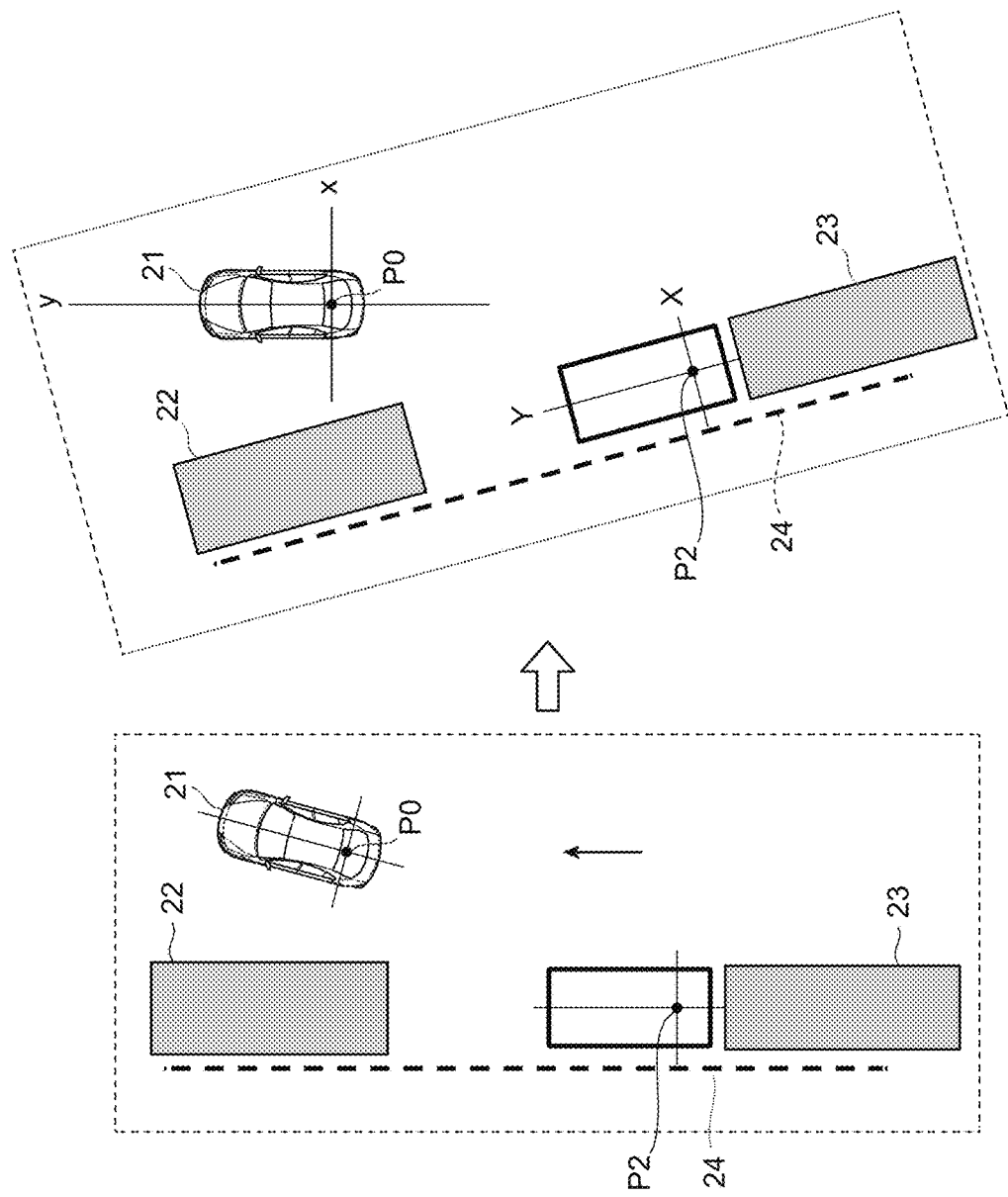
FIG. 12 is a diagram for explaining an example of the method for calculating the parking-space leaving route.
Figure 13:
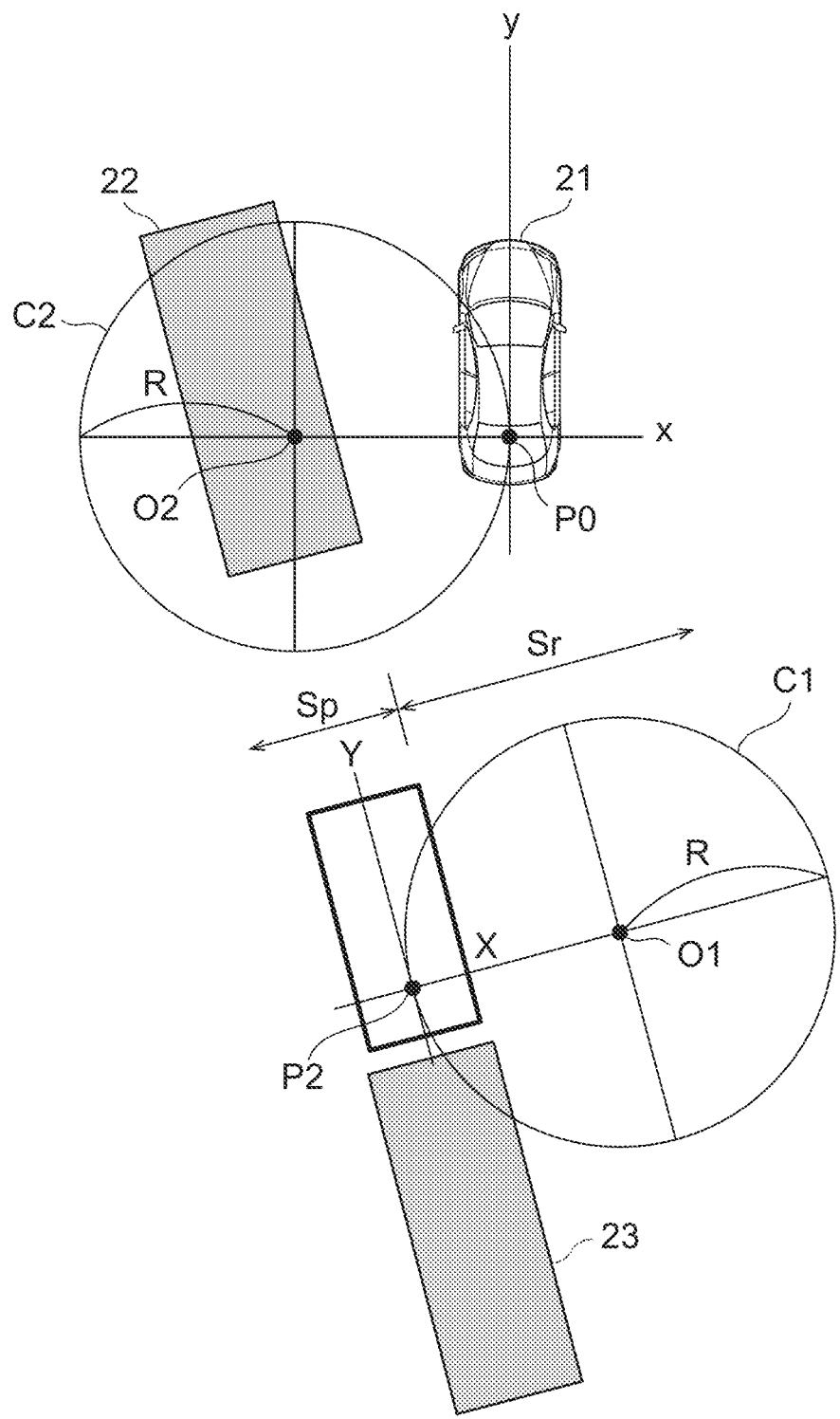
FIG. 13 is a diagram for explaining an example of the method for calculating the parking-space leaving route.
Figure 22:
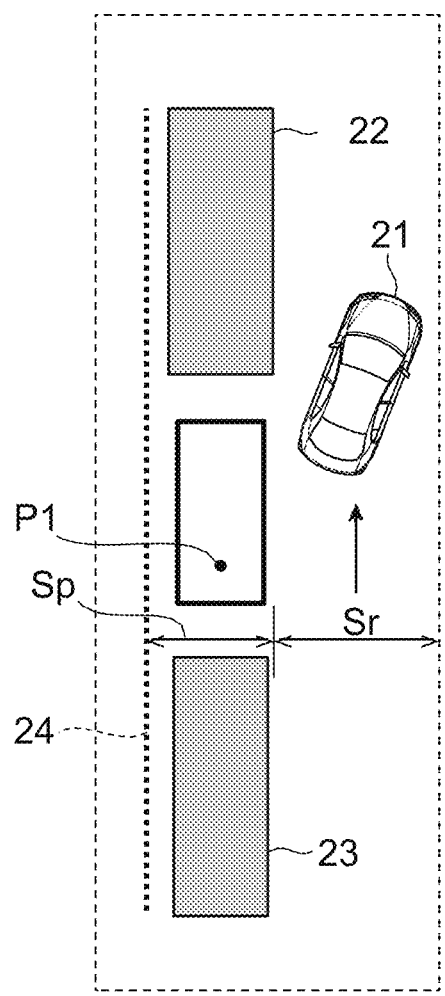
FIG. 22 is a diagram for explaining another example of the method for calculating the parking-space leaving route.
Figure 23:
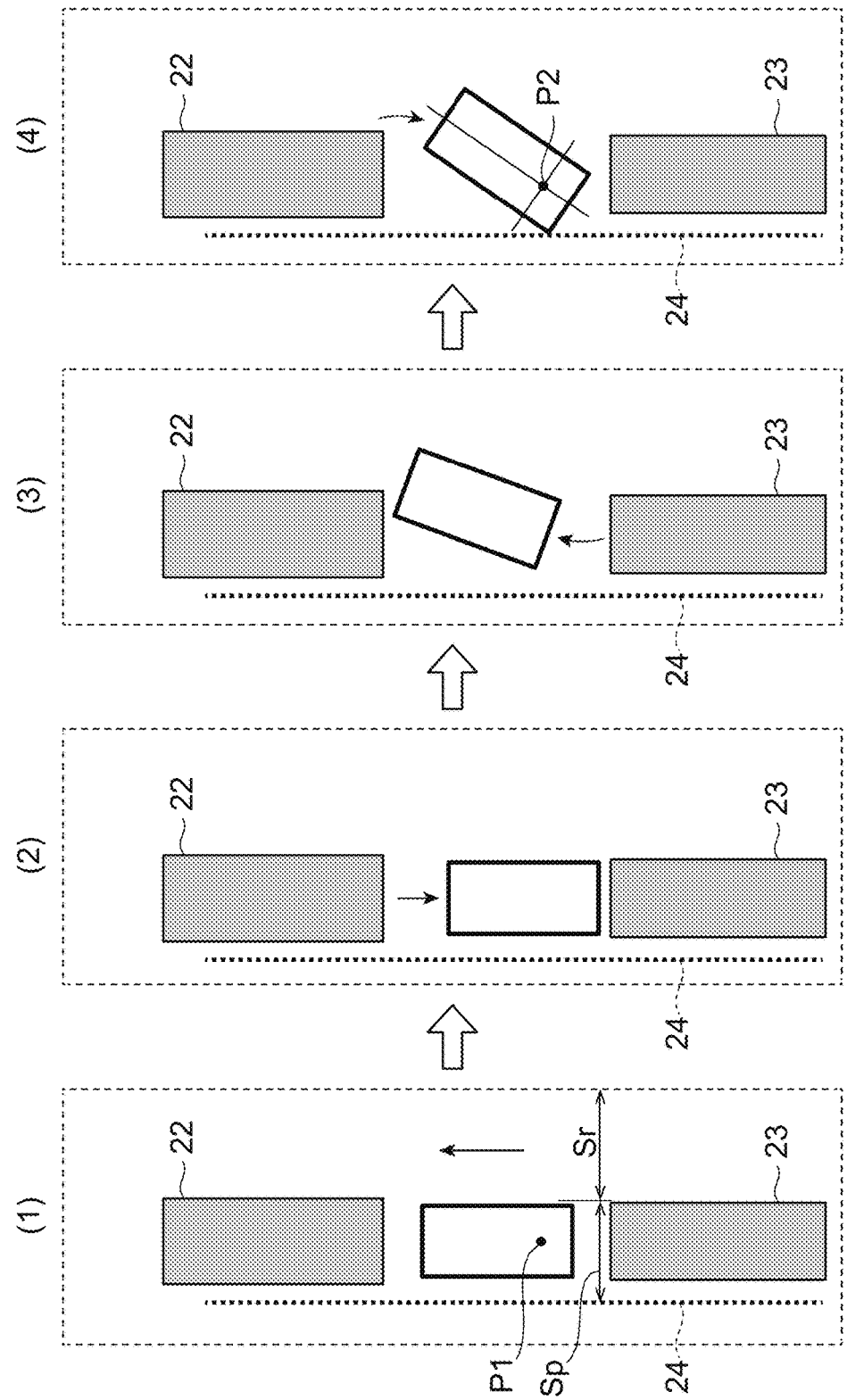
FIG. 23 is a diagram for explaining another example of the method for calculating the parking-space leaving route.
Figure 24:
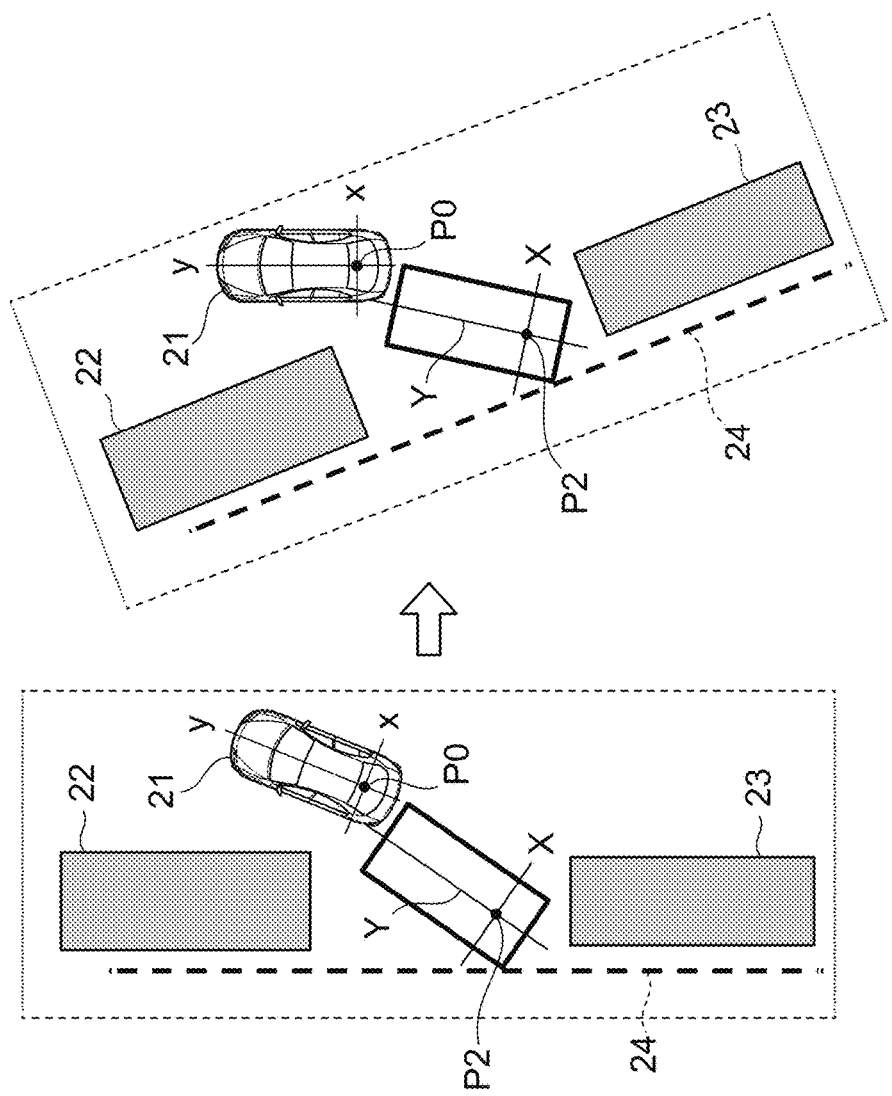
FIG. 24 is a diagram for explaining another example of the method for calculating the parking-space leaving route.
Figure 25:
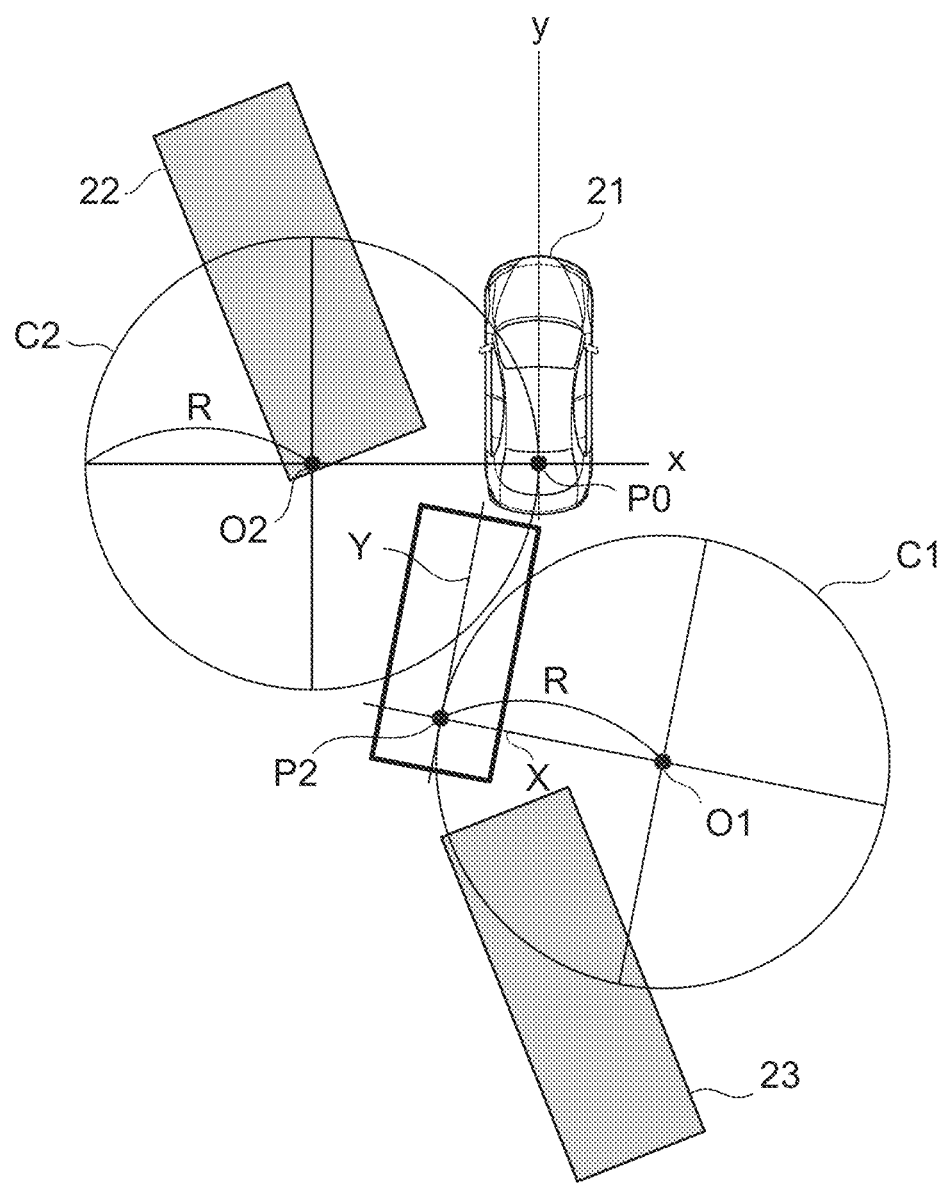
FIG. 25 is a diagram for explaining another example of the method for calculating the parking-space leaving route.

For example, when the target parking position P1 is set as the escapable position P2 as illustrated in FIG. 11 and FIG. 12 or when the escapable route is calculated and the escapable position P2 is set separately from the target parking position as illustrated in FIG. 22 to FIG. 24, the first normal coordinates whose origin is the target parking position P1 are coordinate-transformed to the second normal coordinates whose origin is the initial position P0 of the driver's own vehicle 21. Then, for example, as illustrated in FIG. 13 and FIG. 25, the first turning circle C1 is set which has a minimum turning radius R to pass through the escapable position P2 and whose center O1 is a position separated from the escapable position P2 by the minimum turning radius R, which is a reference distance, in the horizontal-axis X-direction of the first normal coordinates and on the passage area Sr side; and the second turning circle C2 is set which has the minimum turning radius R to pass through the initial position P0 and whose center O2 is a position separated from the initial position P0 by the minimum turning radius R in the horizontal-axis X-direction of the second normal coordinates and on the parking area Sp side (S112).

Incidentally, in this embodiment, the radius of the first turning circle C1 and the radius of the second turning circle C2 are set as the minimum turning radius R of the driver's own vehicle 21; however, any radius may be used as long as the above-mentioned radius is equal to or more than the minimum turning radius R and the radius of the first turning circle C1 is the same as the radius of the second turning circle C2.

Then, whether the first turning circle C1 and the second turning circle C2 intersect each other at two points or not is judged (S113). Under this circumstance, if the first turning circle C1 and the second turning circle C2 intersect each other at two points, the parking-space leaving route to the target parking position P1 cannot be calculated at the initial position P0. In other words, it is determined that the parking-space leaving route cannot be calculated; and then the flow is terminated. On the other hand, if the first turning circle C1 and the second turning circle C2 are separated from each other and do not intersect each other or intersect each other only at one point, it is determined that the parking-space leaving route can be calculated; and then the processing proceeds to processing in step S114 and subsequent steps.

Figure 21:
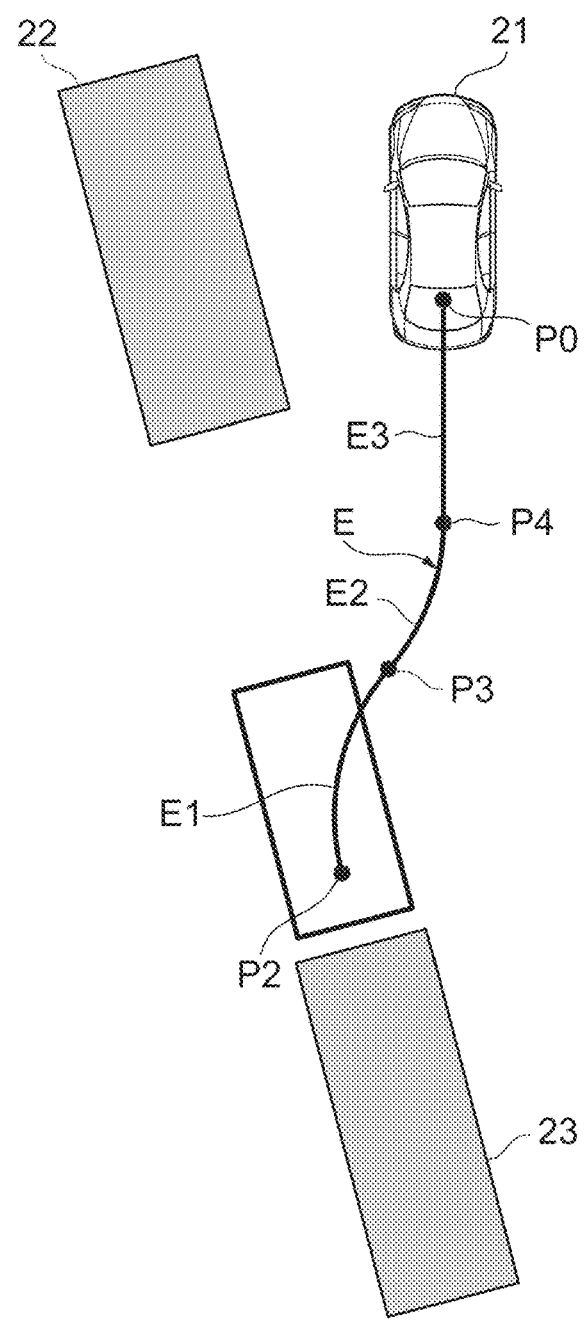
FIG. 21 is a diagram for explaining an example of the method for calculating the parking-space leaving route.
Figure 33:
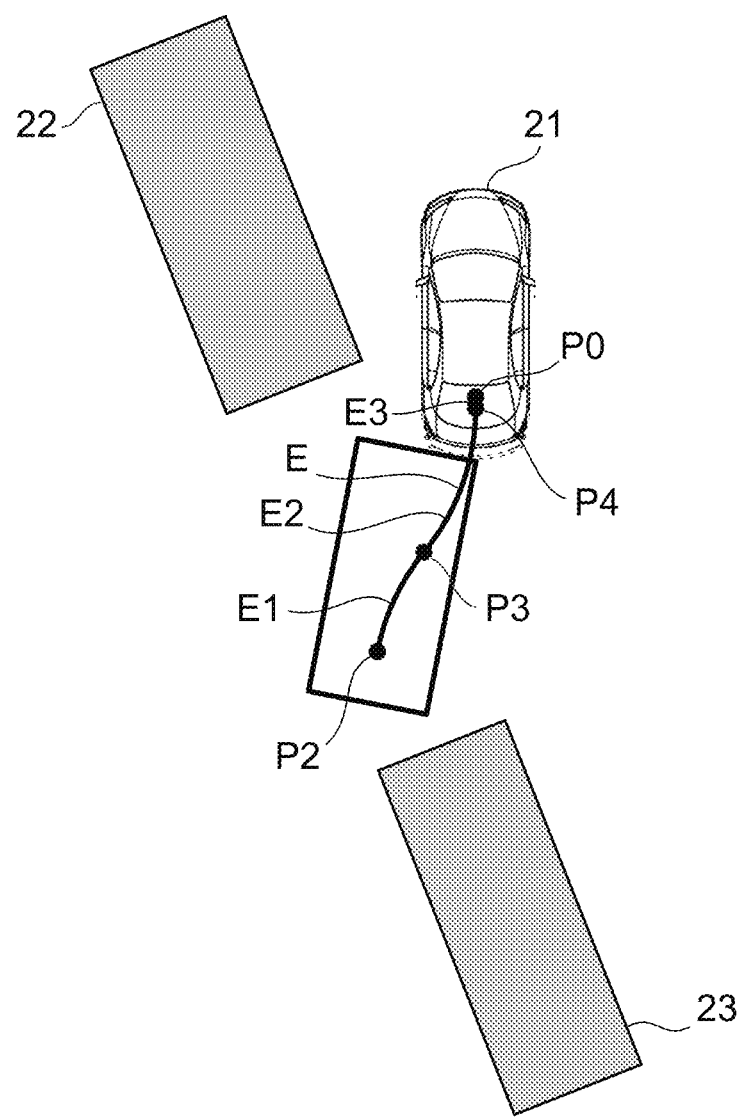
FIG. 33 is a diagram for explaining another example of the method for calculating the parking-space leaving route.

In the processing of step S114 and subsequent steps, a route for turning the steering wheel continuously to the right and the left with the minimum turning radius R and moving forward from the escapable position P2 to the initial position P0 is calculated as the parking-space leaving route. The parking-space leaving route E has, for example, as illustrated in FIG. 21 and FIG. 33, a first turning movement route E1 for moving from the escapable position P2 to a first turning movement position P3, a second turning movement route E2, which continuously follows the first turning movement route E1, for moving from the first turning movement position P3 to a second turning movement position P4, and a straight advance movement route E3, which continuously follows the second turning movement route E2, for moving from the second turning movement position P4 to the initial position P0, each of which is calculated by the processing from step S114 to step S116.

Firstly, the processing for calculating the first turning movement route E1 is executed (S114).

The first turning movement route E1 is a route for moving from the escapable position P2 to the first turning movement position P3 by turning with the minimum turning radius R towards the passage area Sr side around the center O1 of the first turning circle C1 (which is also the center of the third turning circle C3) as the turning center.

Figure 18:
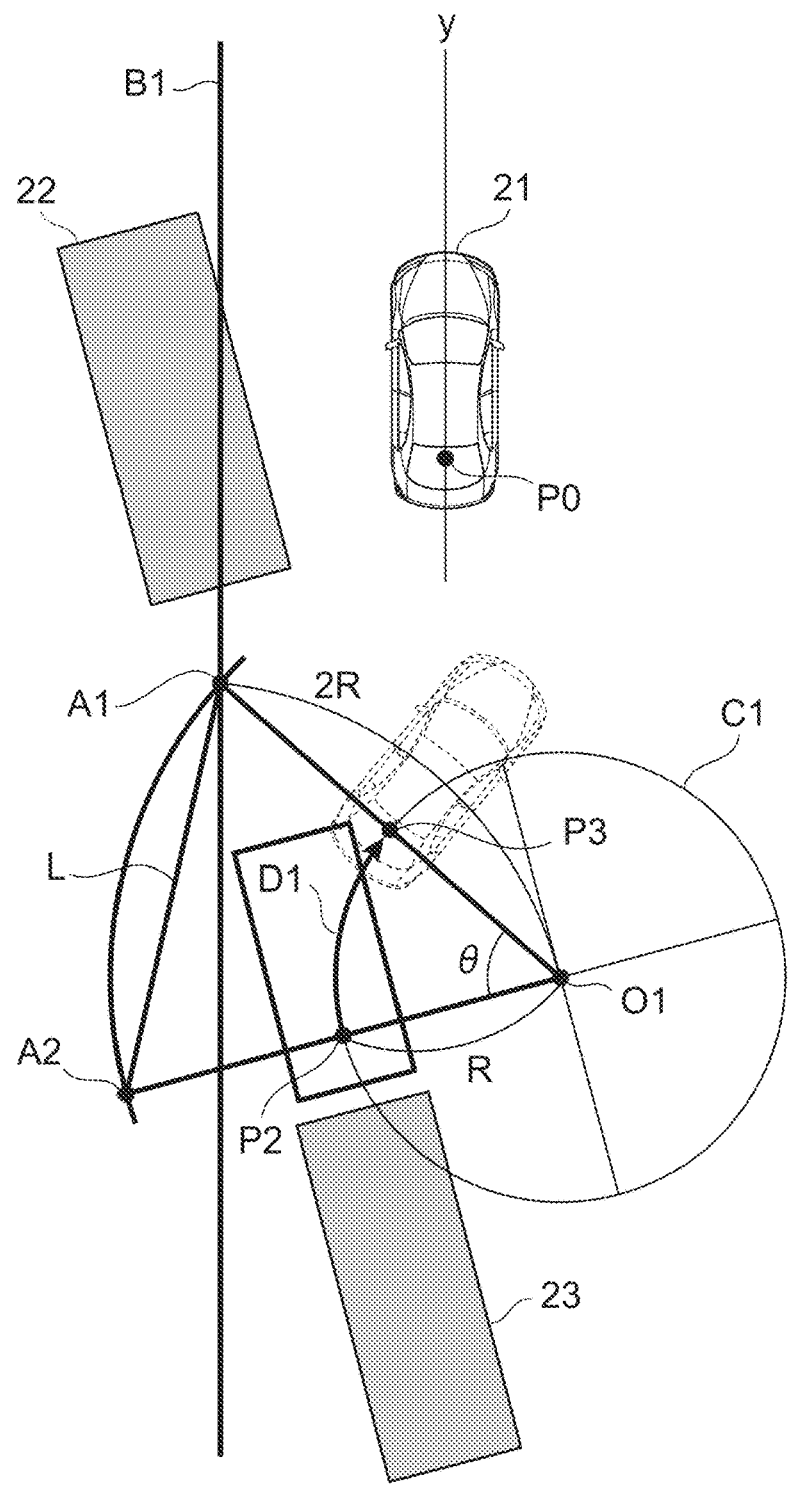
FIG. 18 is a diagram for explaining an example of the method for calculating the parking-space leaving route.
Figure 30:
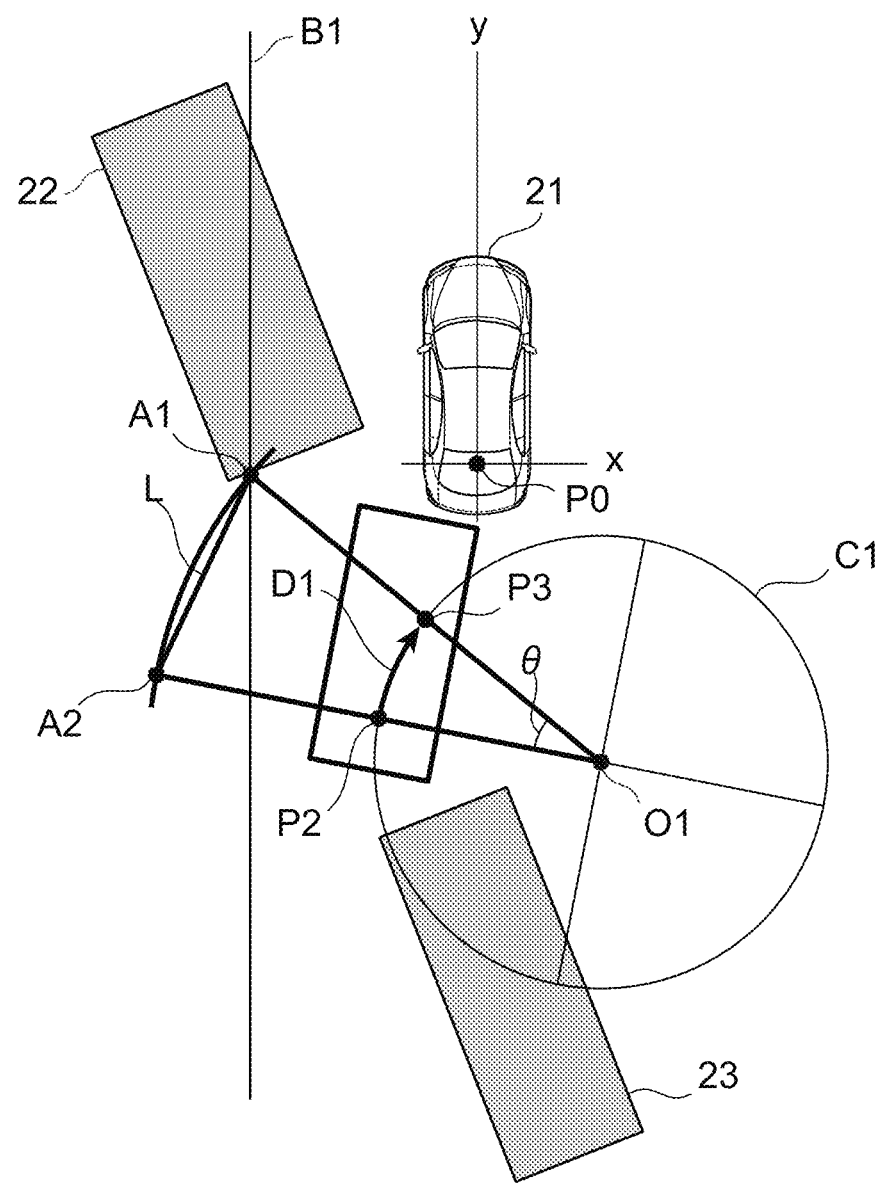
FIG. 30 is a diagram for explaining another example of the method for calculating the parking-space leaving route.

The first turning movement position P3 is a position moved from the escapable position P2 by a first turning movement amount D1 by turning the steering wheel to the right (see FIG. 18 and FIG. 30).

Figure 10:
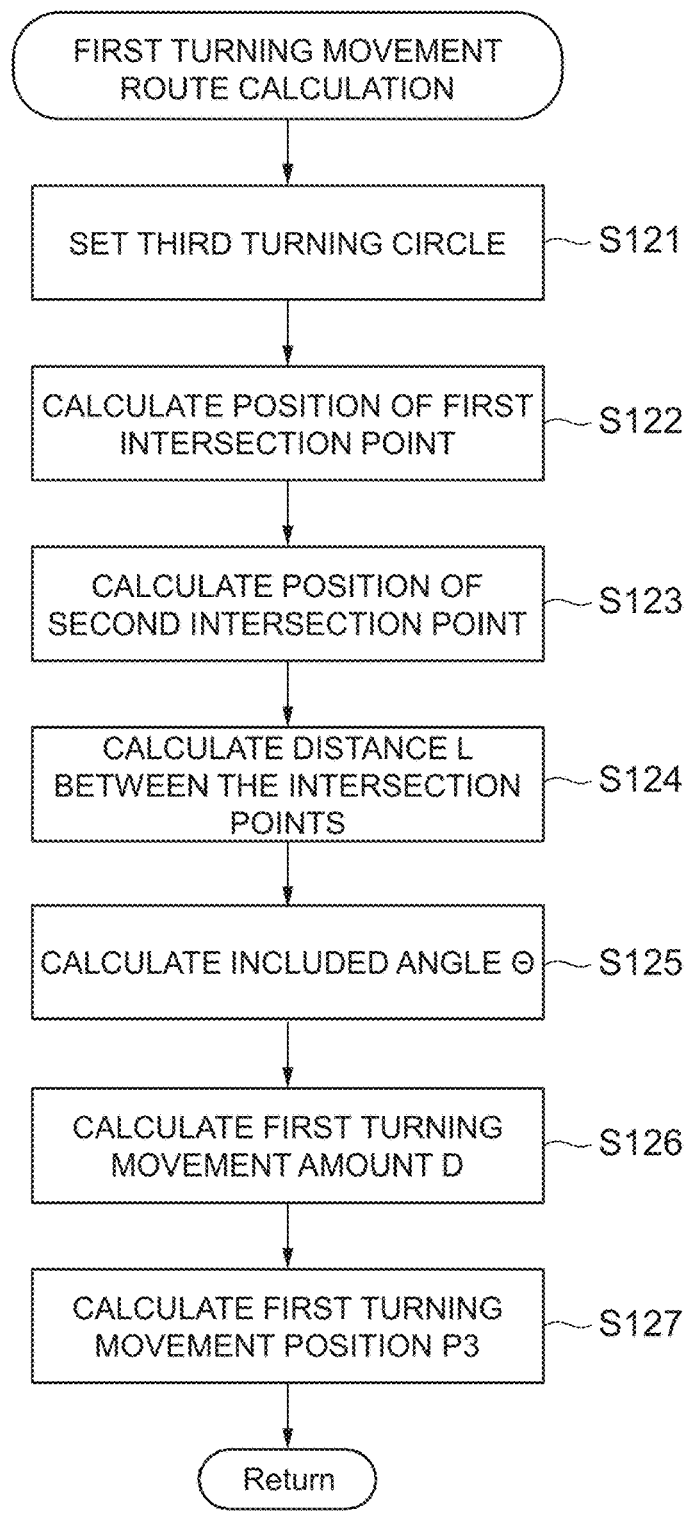
FIG. 10 is a flowchart explaining a method for calculating a first turning movement route.

FIG. 10 is a flowchart for explaining a method for calculating the first turning movement position P3.

Figure 14:
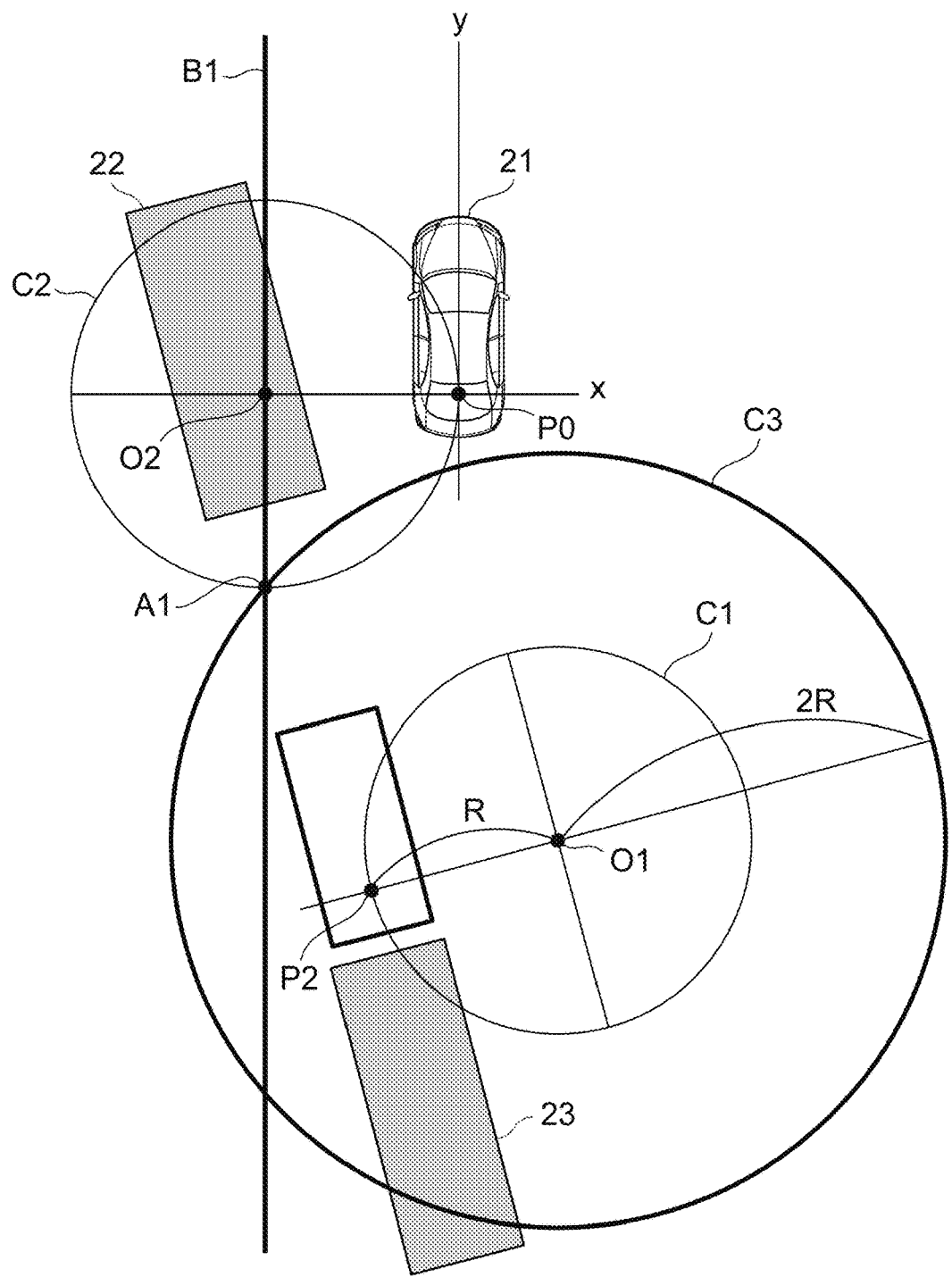
FIG. 14 is a diagram for explaining an example of the method for calculating the parking-space leaving route.
Figure 26:
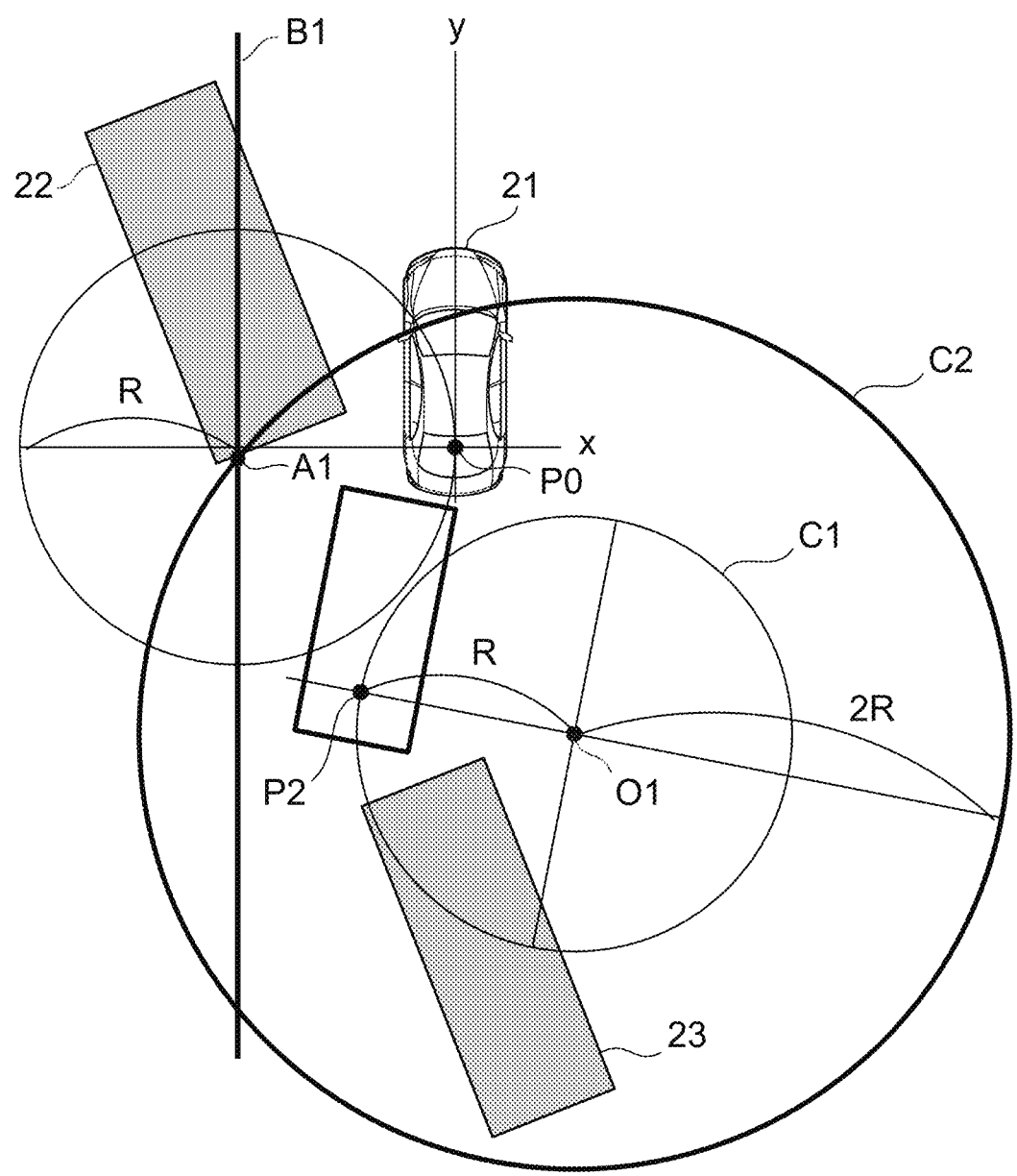
FIG. 26 is a diagram for explaining another example of the method for calculating the parking-space leaving route.

Firstly, as illustrated in FIG. 14 and FIG. 26, the third turning circle C3 which is a concentric circle of the first turning circle C1 and is a double-sized circle having a radius 2R that is twice as large as the radius R of the first turning circle C1 is set (S121). In other words, the third turning circle C3 whose center is the position (center O1) separated from the escapable position P2 by the specified reference distance (the radius R) in the horizontal-axis X-direction of the first normal coordinates and on the passage area Sr side, and which has the radius 2R that is twice as large as the reference distance is set.

The third turning circle C3 forms a shape that matches the locus of the center of a turning circle that is drawn when the driver's own vehicle moving along the first turning circle C1 turns in a reverse direction. For example, when the driver's own vehicle 21 which is moving along the first turning circle C1 turns with the radius R in a direction to move away from the first turning circle C, a turning circle which has the same size as that of the first turning circle C1 and contacts the first turning circle is formed outside the first turning circle C1. When a plurality of such turning circles which contact the first turning circle are located to surround the outside of the first turning circle, a circular locus which is drawn with the centers of the plurality of these turning circles forms the third turning circle C3.

Then, a first reference line B1 which passes through the position (the center O2) separated from the initial position P0 by the reference distance (the radius R) in the horizontal-axis X-direction of the second normal coordinates and on the parking area Sp side and extends in the vertical-axis Y-direction of the second normal coordinates is set; and a first intersection point A1 at which the first reference line B1 intersects with the third turning circle C3 is calculated (S122). Although there are two intersection points where the first reference line B1 and the third turning circle C3 intersect each other, the intersection point positioned ahead of the escapable position P2 in the vertical-axis Y-direction of the first normal coordinates is adopted as the first intersection point A1. In other words, the parking-space leaving route calculation unit 12: calculates the first reference line B1 which is a front-back direction of the driver's own vehicle 21 and passes through the center of the second turning circle C2; and sets the intersection point which is an intersection point between the first reference line B1 and the third turning circle C3 and is located in a direction closer to the driver's own vehicle 21, as the first intersection point A1.

Figure 15:
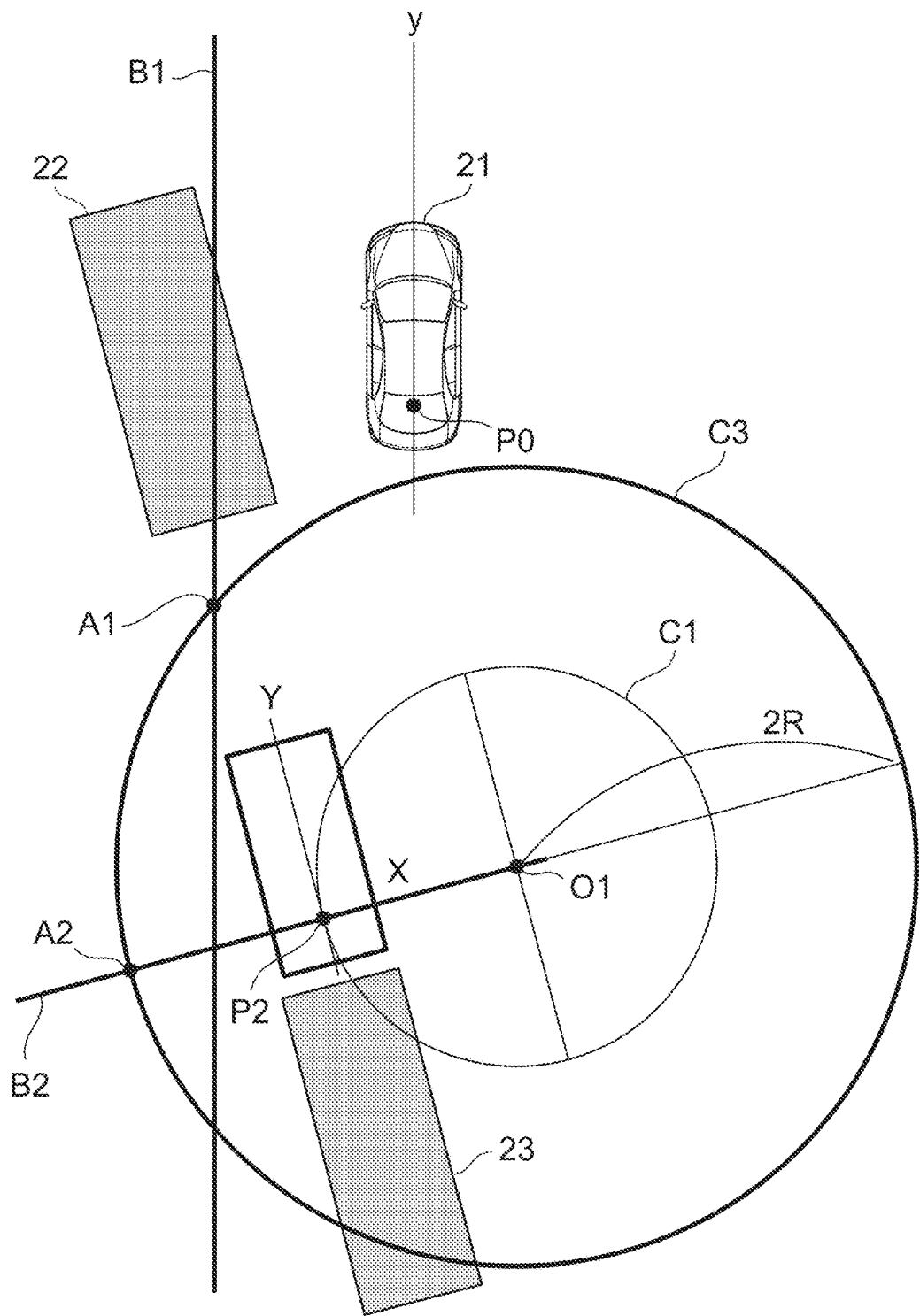
FIG. 15 is a diagram for explaining an example of the method for calculating the parking-space leaving route.
Figure 27:
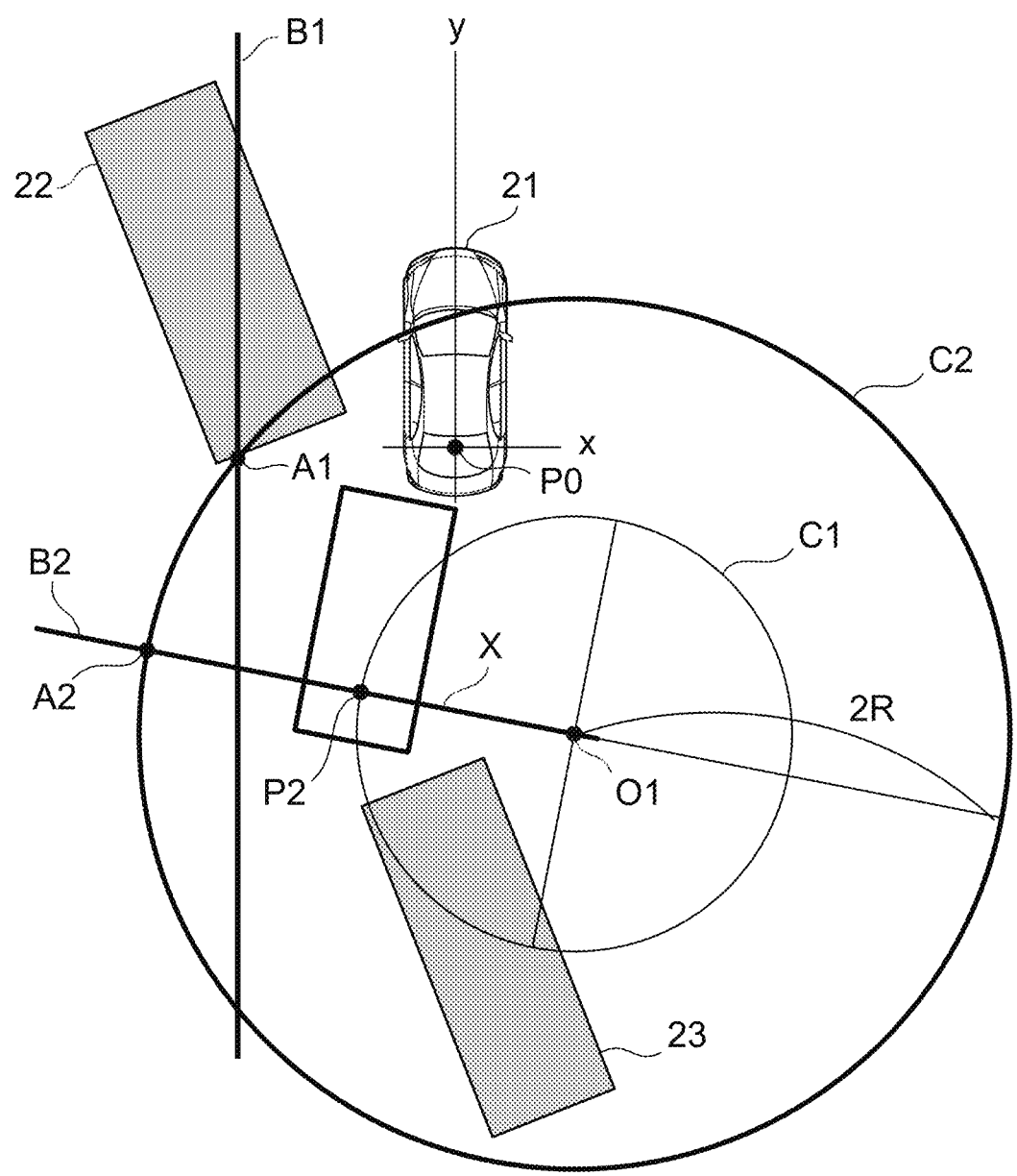
FIG. 27 is a diagram for explaining another example of the method for calculating the parking-space leaving route.

Next, as illustrated in FIG. 15 and FIG. 27, a second reference line B2 which passes from the center O1 of the first turning circle C1 through the escapable position P2 and extends in the horizontal-axis X-direction of the first normal coordinates is set; and the position of a second intersection point A2 where the second reference line B2 and the third turning circle C3 intersect each other is calculated (S123).

Figure 16:
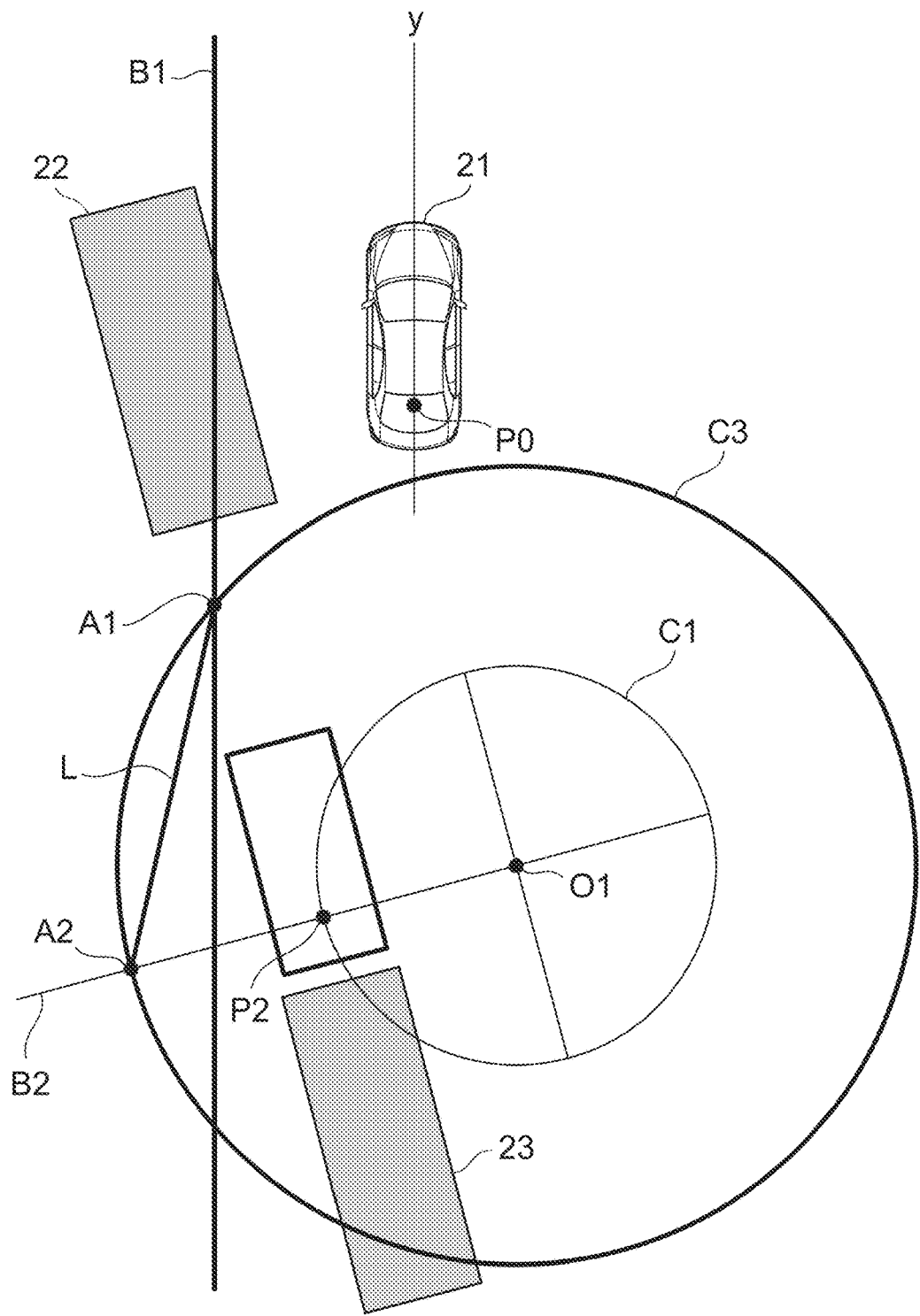
FIG. 16 is a diagram for explaining an example of the method for calculating the parking-space leaving route.
Figure 28:
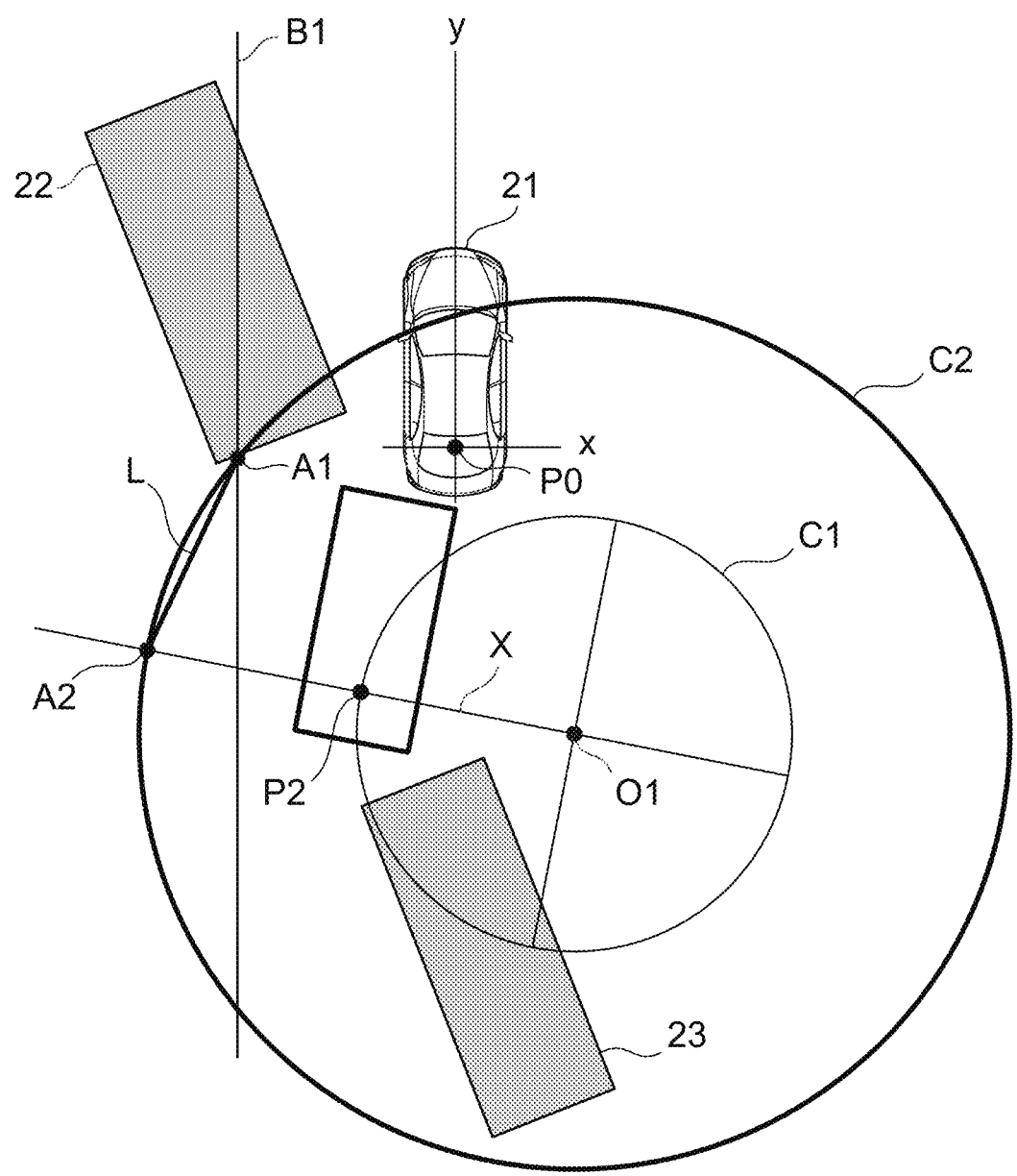
FIG. 28 is a diagram for explaining another example of the method for calculating the parking-space leaving route.

Then, as illustrated in FIG. 16 and FIG. 28, the distance L between the intersection points, the first intersection point A1 and the second intersection point A2 (S124).

Assuming that coordinate positions of the first intersection point A1 and the second intersection point A in the second normal coordinates are $(x_1, y_1)$ and $(x_2, y_2)$, the distance L between the intersection points can be calculated according to Expression (1) below.

[Math. 1]

$$L=\sqrt{(x_1-x_2)^2+(y_1-y_2)^2} \qquad \text{Expression (1)}$$

Figure 17:
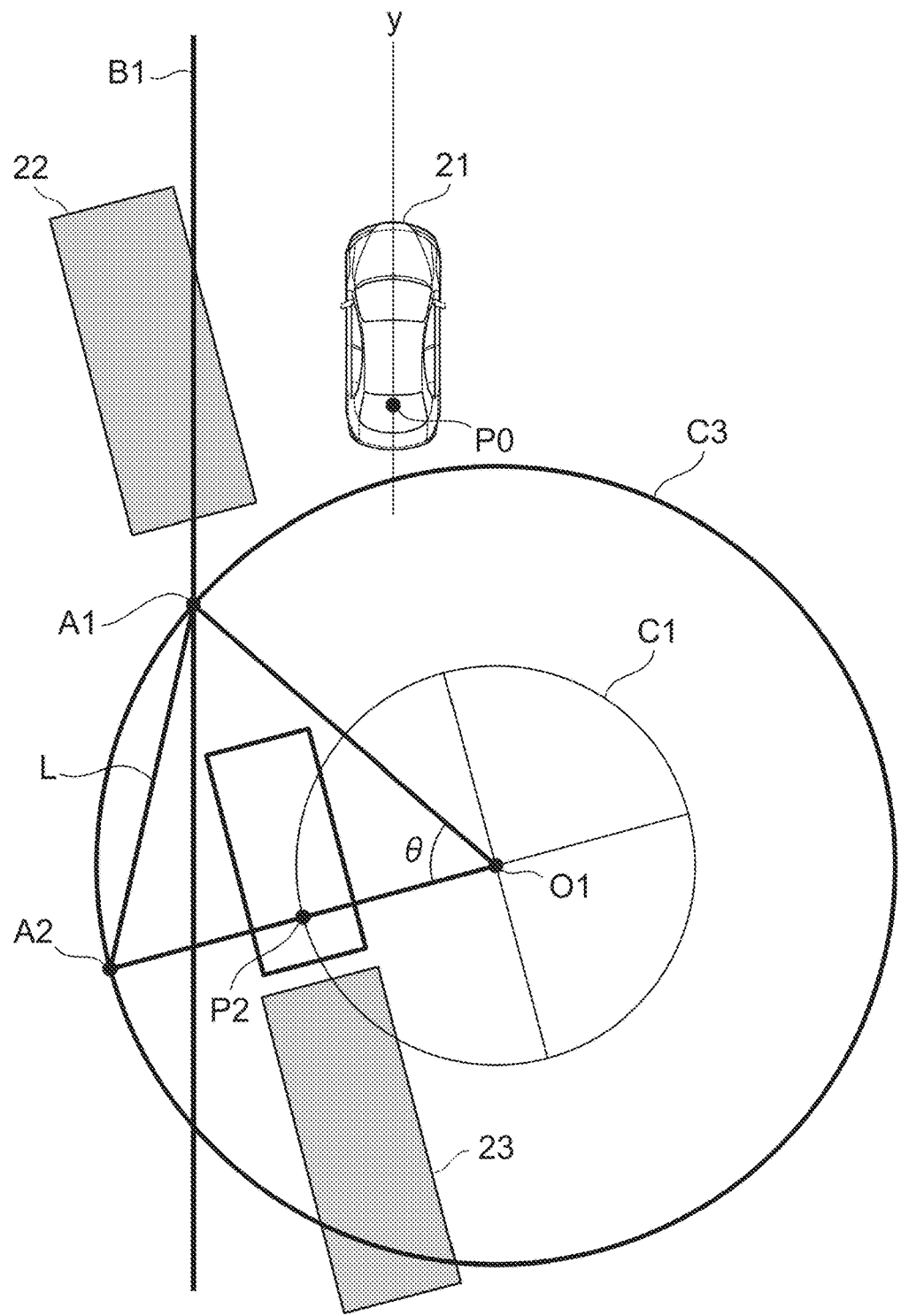
FIG. 17 is a diagram for explaining an example of the method for calculating the parking-space leaving route.
Figure 29:
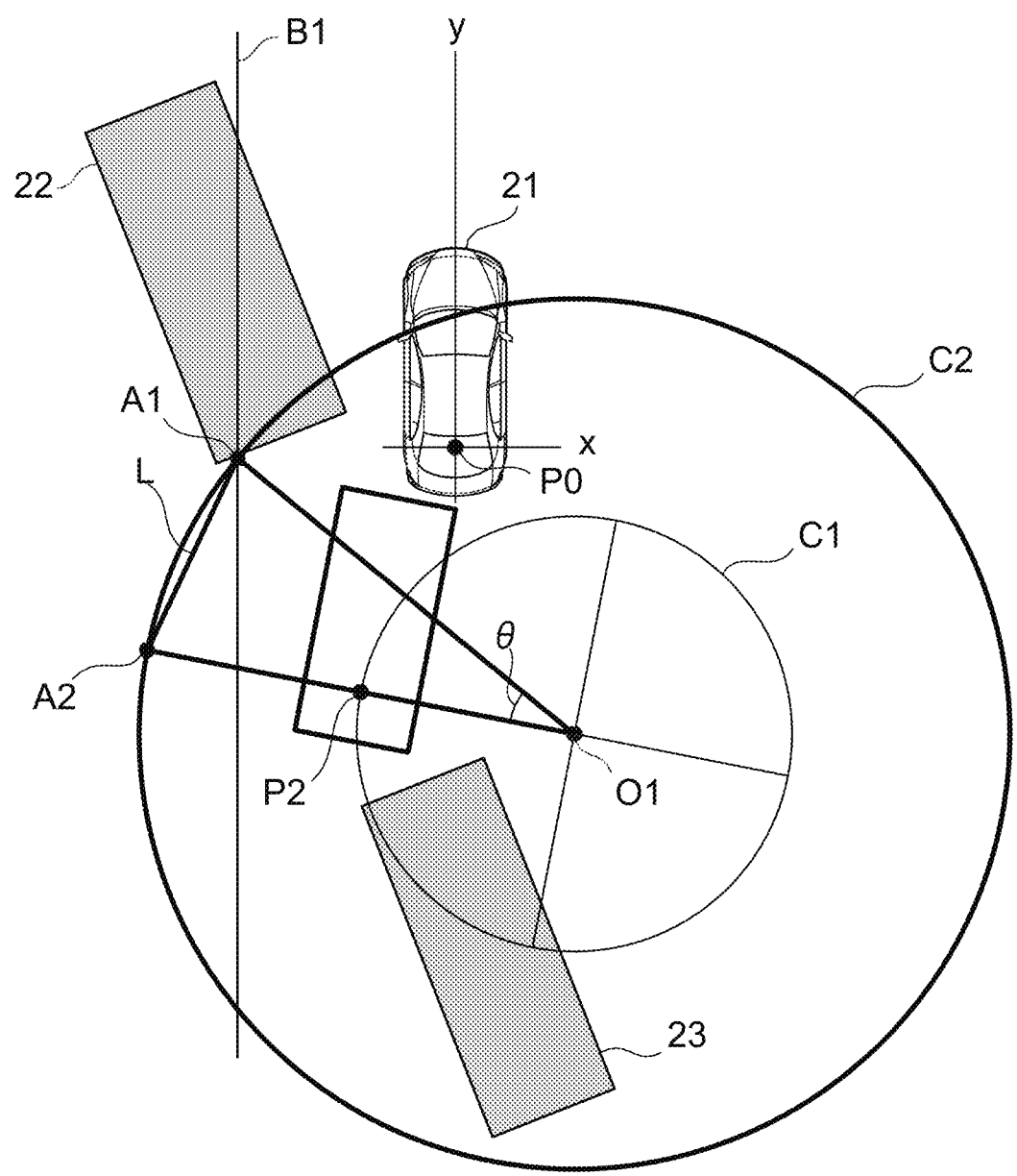
FIG. 29 is a diagram for explaining another example of the method for calculating the parking-space leaving route.

Then, as illustrated in FIG. 17 and FIG. 29, an included angle θ which is an angle between the first intersection point A1 and the second intersection point A2 at the center O1 of the first turning circle C1 is calculated by using the distance L between the intersection points and the radius 2R of the third turning circle C3 (S125). The included angle θ can be calculated according to Expression (2) below.

[Math. 2]

$$\theta = \sin^{-1}\left(\frac{L}{4.0*R}\right) \qquad \text{Expression (2)}$$

Then, as illustrated in FIG. 18 and FIG. 30, a first turning movement amount D1 by turning the steering wheel to the right is calculated by using the included angle θ and the radius R of the first turning circle C1 (the reference distance) (S126). The first turning movement amount D1 is a movement amount from the escapable position P2 to the first turning movement position P3 and can be calculated according to Expression (3) below.

[Math. 3]

$$D1=R\theta \qquad \text{Expression (3)}$$

The first turning movement position P3 is calculated by using this first turning movement amount D1 (S127). Then, the first turning movement route E1 (see FIG. 21 and FIG. 33) is calculated based on the first turning movement position P3.

Figure 19:
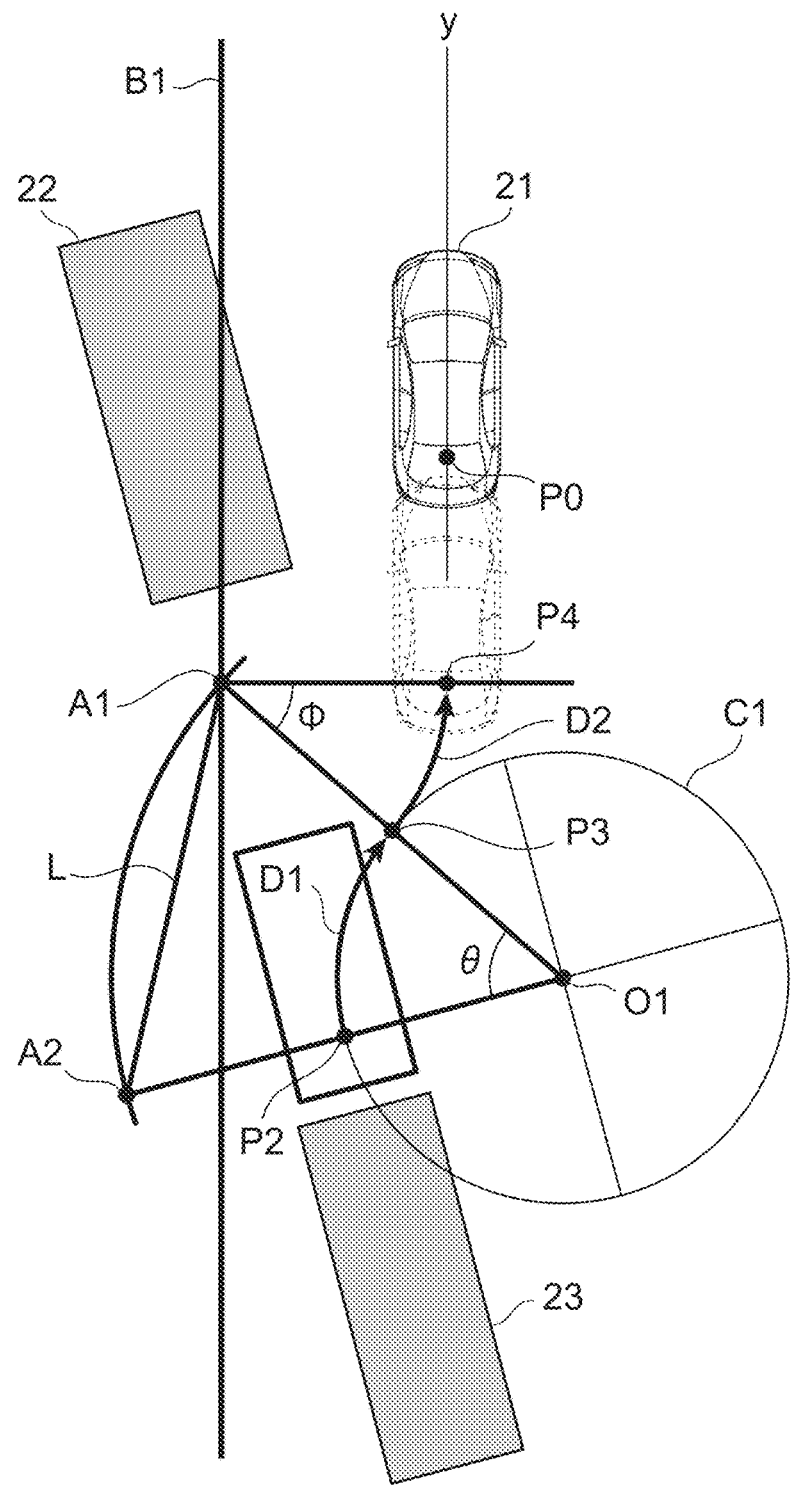
FIG. 19 is a diagram for explaining an example of the method for calculating the parking-space leaving route.
Figure 31:
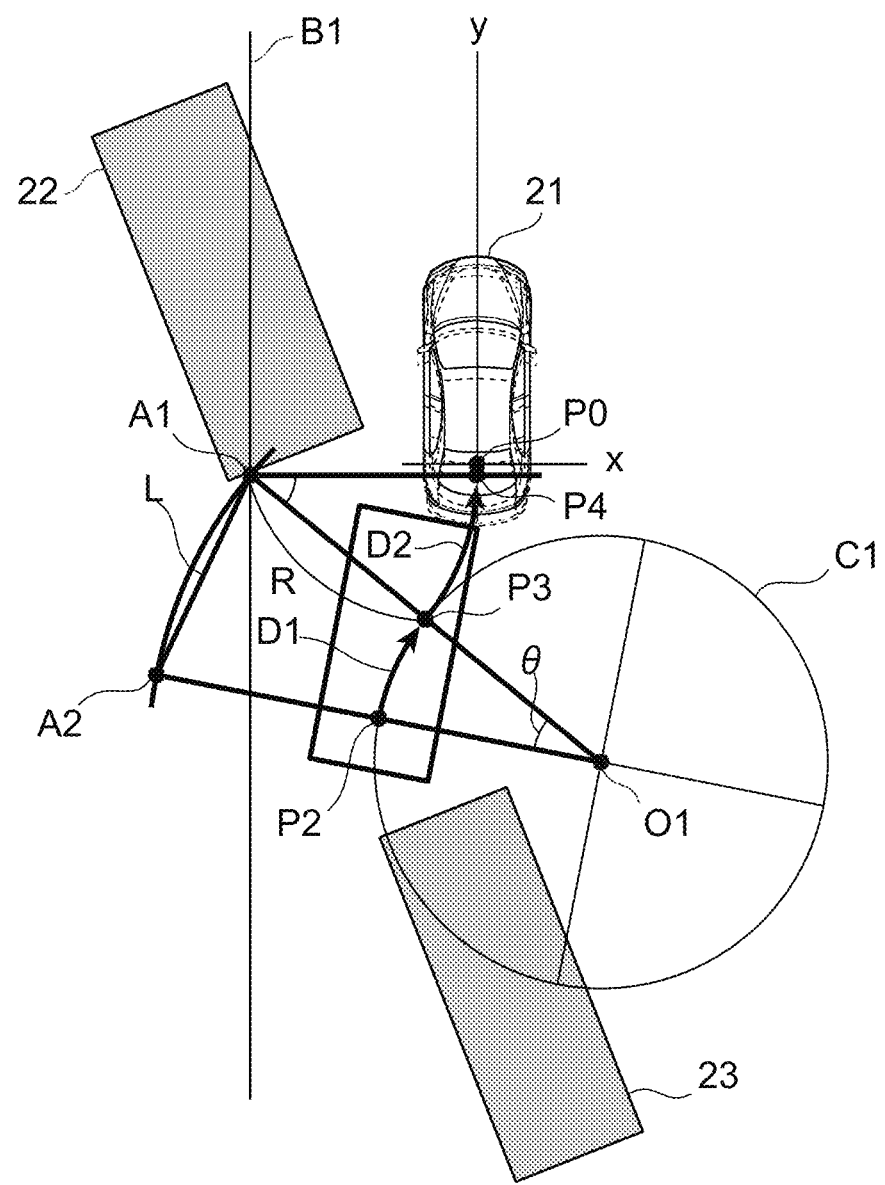
FIG. 31 is a diagram for explaining another example of the method for calculating the parking-space leaving route.

Next, the processing for calculating the second turning movement route E2 is executed (S115 in FIG. 9). The second turning movement route E2 is a route for moving from the first turning movement position P3 to the second turning movement position P4 by turning with the minimum turning radius R around the first intersection point A1 as the center towards the parking area Sp side. The second turning movement position P4 is, for example, as illustrated in FIG. 19 and FIG. 31, a position moved from the first turning movement position P3 by the second turning movement amount D2 by turning the steering wheel to the left. Regarding the second turning movement route E2, when the vehicle is moved from the first turning movement position P3 to the second turning movement position P4, the vehicle is positioned on the vertical axis y of the second normal coordinates, which passes through the initial position P0, and the vehicle's facing direction th becomes the same facing direction as that of the driver's own vehicle 21 at the initial position P0.

In order to calculate the second turning movement position P4, the vehicle's facing direction th at the first turning movement position P3 is firstly calculated. The vehicle's facing direction th at the first turning movement position P3 is an inclination angle φ relative to the horizontal axis x of the second normal coordinates and can be expressed by Expression (4) below.

[Math. 4]

$$\varphi = th \qquad \text{Expression (4)}$$

Next, the second turning movement amount D2 which is a movement amount from the first turning movement position P3 to the second turning movement position P4 is calculated. A turning angle around the first intersection point A1 as the center to move from the first turning movement position P3 to the second turning movement position P4 is the inclination angle φ relative to the horizontal axis x of the second normal coordinates and the distance between the first intersection point A1 and the first turning movement position P3 is equal to the radius R of the first turning circle C1. Therefore, the second turning movement amount D2 can be calculated according to Expression (5) below on the basis of the inclination angle φ and the radius R.

[Math. 5]

$$D2 = R\varphi \qquad \text{Expression (5)}$$

The second turning movement position P4 is calculated by using this second turning movement amount D2. Then, the second turning movement route E2 (see FIG. 21 and FIG. 33) is calculated based on the second turning movement position P4.

Figure 20:
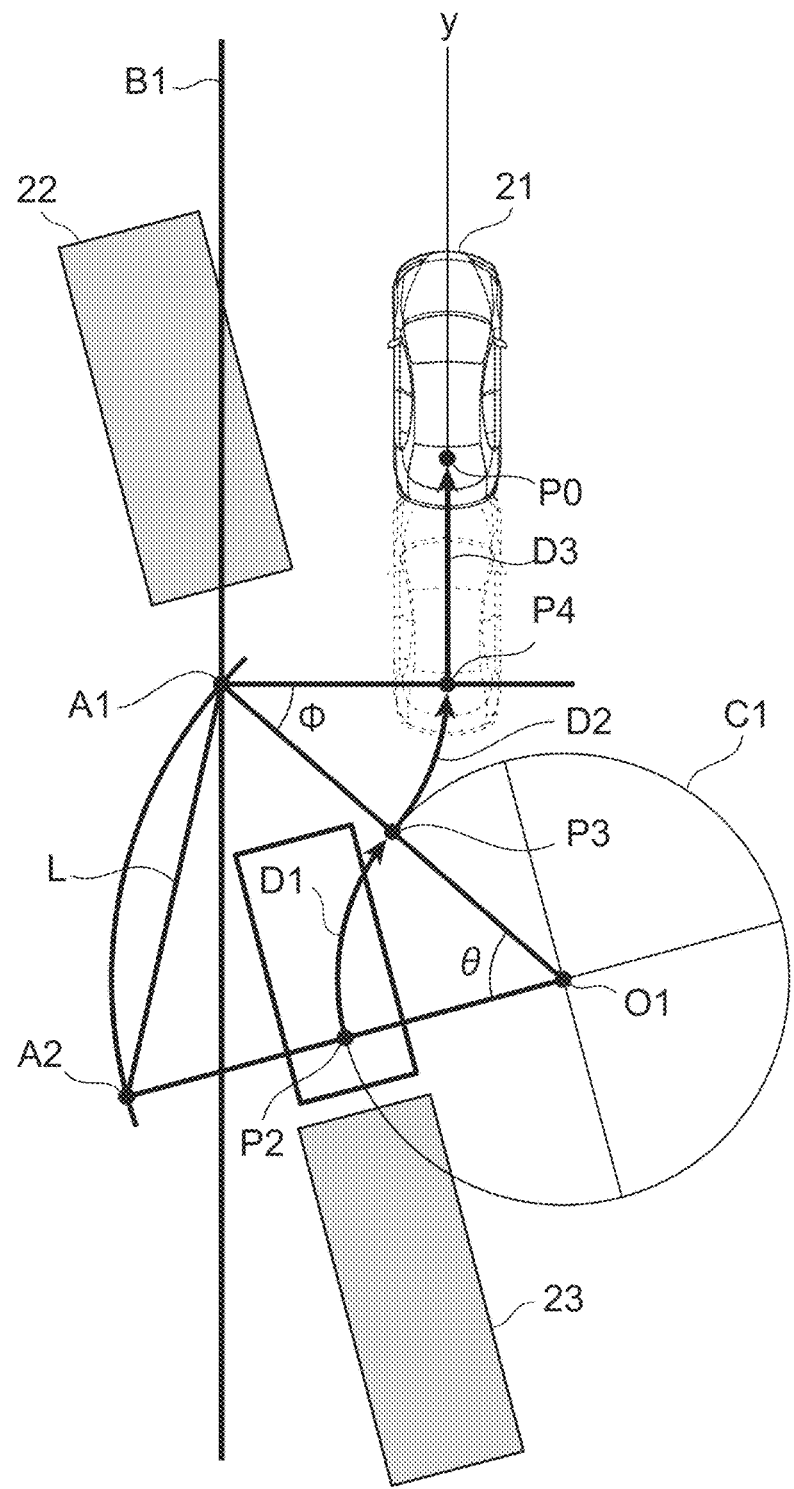
FIG. 20 is a diagram for explaining an example of the method for calculating the parking-space leaving route.
Figure 32:
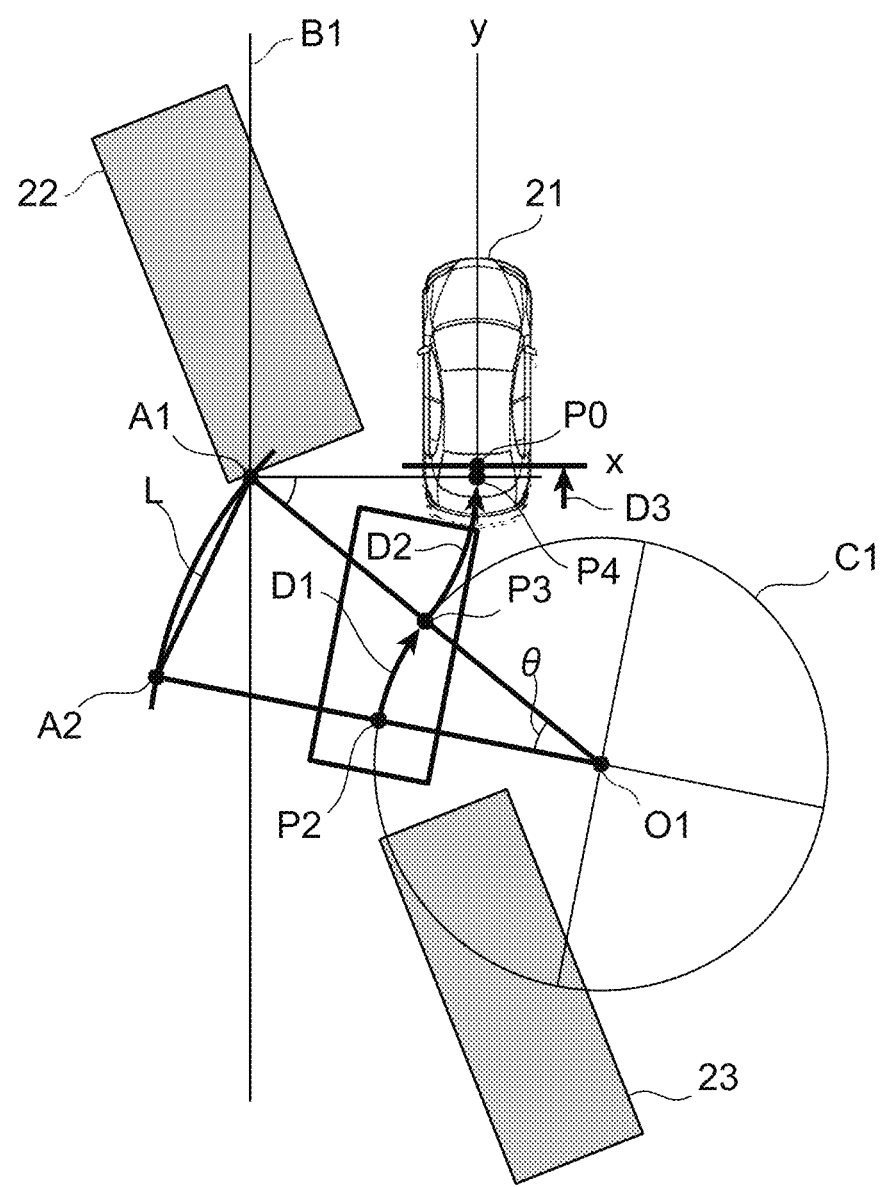
FIG. 32 is a diagram for explaining another example of the method for calculating the parking-space leaving route.

Next, the processing for calculating the straight advance movement route E3 is executed (S116 in FIG. 9). The straight advance movement route E3 is, for example, a route for a straight advance movement from the second turning movement position P4 to the initial position P0, that is, a route which connects the second turning movement route and the initial position P0 of the driver's own vehicle as illustrated in FIG. 20 and FIG. 32. The second turning movement position P4 exists on the vertical axis y which passes through the initial position P0. Therefore, the straight advance movement amount D3 from the second turning movement position P4 to the initial position P0 is represented by a vertical-direction difference distance from the second turning movement position P4 to the initial position P0 in the second normal coordinates. The straight advance movement route E3 is calculated by using this straight advance movement amount D3.

The parking-space leaving route is generated by connecting the first turning movement route E1, the second turning movement route E2, and the straight advance movement route E3 together as illustrated in FIG. 21 and FIG. 33.

Incidentally, if it is determined in step S113 in FIG. 9 that the first turning circle and the second turning circle intersect each other at one point, the straight advance movement amount D3 does not exist. Therefore, the processing of step S116 for calculating the straight advance movement route E3 is omitted and the parking-space leaving route E is calculated by using the first turning movement route E1 and the second turning movement route E2.

<Parking Route Setting Unit>

The parking route setting unit 13 sets the parking route by using the escapable route from the target parking position P1 to the escapable position P2 and the parking-space leaving route E from the escapable position P2 to the initial position P0. The parking route is a route for reverse running by connecting the escapable route and the parking-space leaving route E.

Next, operational advantages of the parking assistance apparatus according to this embodiment will be explained. The parking assistance apparatus according to this embodiment: calculates the first turning movement route E1 for moving forward and turning towards the passage area Sr side with the minimum turning radius R from the escapable position P2, the second turning movement route E2 for moving forward and turning towards the parking area Sp side with the minimum turning radius R continuously following the first turning movement route E1, and the straight advance movement route E3 for moving straight forward to the initial position P0 continuously following the second turning movement route E2; and calculates the parking-space leaving route E by using the first turning movement route E1, the second turning movement route E2, and the straight advance movement route E3. The parking-space leaving route E is configured by continuously linking the second turning movement route E2 with the same minimum turning radius R to the first turning movement route E1 with the minimum turning radius R and further continuously linking the straight advance movement route E3 to the second turning movement route E2.

Therefore, as compared with a conventional parking route that connects a circular arc, which passes through the target parking position, to a circular arc which passes through the initial position, it is easy to shorten the route length and it is possible to calculate a more compact parking-space leaving route and generate the route without moving further away from the target parking position towards the passage direction than the conventional route. Furthermore, since the parking-space leaving route is generated by continuously connecting the routes both having the minimum turning radius R, the initial position can be also set at a position away from the parking area Sp in a passage-width direction, so that the initial position can be set with a wider degree of freedom and a route generation rate can be increased more than the conventional one.

The embodiments of the present invention have been described above in detail; however, the present invention is not limited to the aforementioned embodiments and various design changes can be made within the range not departing from the spirit of the present invention as described in the claims. For example, the aforementioned embodiments have been described in detail in order to explain the present invention in an easily comprehensible manner and are not necessarily limited to those having all the configurations explained above. Furthermore, part of the configuration of a certain embodiment can be replaced with the configuration of another embodiment and the configuration of another embodiment can be added to the configuration of a certain embodiment. Also, another configuration can be added to, deleted from, or replaced with part of the configuration of each embodiment.

REFERENCE SIGNS LIST

21: driver's own vehicle
22: forward obstacle

23: backward obstacle
24: lateral-side obstacle
A1: first intersection point
A2: second intersection point
B1: first reference line
B2: second reference line
C1: first turning circle
C2: second turning circle
C3: third turning circle (double-sized circle)
D1: first turning movement amount
D2: second turning movement amount
D3: straight advance movement amount
O1: center of first turning circle (center of third turning circle)
O2: center of second turning circle
P0: initial position
P1: target parking position
P2: escapable position
R: radius (reference distance)
Sp: parking area
Sr: passage area
θ: included angle
φ: inclination angle

The invention claimed is:

1. A parking assistance apparatus for assisting parallel parking of a driver's own vehicle, the parking assistance apparatus comprising:
an escapable position calculation unit configured to calculate an escapable position where the driver's own vehicle can escape from a parking area to a passage area by moving the driver's own vehicle on the basis of a target parking position;
a parking-space leaving route calculation unit configured to calculate a parking-space leaving route where the driver's own vehicle can be moved from the escapable position to an initial position in the passage area; and
a parking route setting unit configured to set a parking route for moving the driver's own vehicle from the initial position to the target parking position according to the parking-space leaving route,
wherein the parking-space leaving route calculation unit calculates the parking-space leaving route by using a first turning circle when turning from the escapable position to a passage side, a second turning circle when turning in a direction of the target parking position at the initial position of the driver's own vehicle, and a third turning circle which is a locus of a turning center when the vehicle has moved along the first turning circle and turns in a direction different from the first turning circle.

2. The parking assistance apparatus according to claim 1, wherein the parking-space leaving route calculation unit:
calculates a first reference line which is a front-back direction of the driver's own vehicle and passes through a center of the second turning circle;
sets an intersection point at which the first reference line and the third turning circle intersect each other and which is an intersection point in a direction closer to the driver's own vehicle, as a first intersection point;
calculates a second intersection point at which a second reference line extending from a center of the third turning circle and passing through the escapable position intersects with the third turning circle;
calculates an angle between the first intersection point and the second intersection point on the basis of a distance between the first intersection point and the second intersection point and a radius of the third turning circle;
calculates a first turning movement amount of a first turning movement route, which is from the target parking position to the escapable position, on the basis of the angle and a preset reference distance;
calculates a second turning movement amount of a second turning movement route from the escapable position to a second turning movement position; and
calculates a straight advance movement route which connects the second turning movement route and the initial position of the driver's own vehicle, and a straight advance movement amount of the straight advance movement route.

3. The parking assistance apparatus according to claim 1, wherein the escapable position calculation unit judges whether or not the driver's own vehicle can escape from the parking area to the passage area by a steering-wheel-turning-and-advance movement or a straight advance movement from the target parking position; and if the escapable position calculation unit determines that the driver's own vehicle can escape, the escapable position calculation unit sets the target parking position as the escapable position; and if the escapable position calculation unit determines that the driver's own vehicle cannot escape, the escapable position calculation unit calculates an escapable route capable of locating the driver's own vehicle at the escapable position by moving the driver's own vehicle forward or backward from the target parking position at least once and then turning a steering wheel; and wherein the parking route setting unit sets the parking route on the basis of the escapable route and the parking-space leaving route.

4. The parking assistance apparatus according to claim 1, wherein when the first turning circle and the second turning circle intersect each other at two points, the parking-space leaving route calculation unit determines that the parking-space leaving route cannot be calculated.

5. The parking assistance apparatus according to claim 1, wherein a minimum turning radius of the driver's own vehicle is the reference distance.

\* \* \* \* \*